US011516127B2

(12) United States Patent
Ranatunga

(10) Patent No.: US 11,516,127 B2
(45) Date of Patent: Nov. 29, 2022

(54) SYSTEM CONTROLLER, CONTROLLING AN IP SWITCH INCLUDING PLURAL SDN SWITCHES

(71) Applicant: SONY CORPORATION, Tokyo (JP)

(72) Inventor: Vijitha Sanjeewa Ranatunga, Kanagawa (JP)

(73) Assignee: SONY CORPORATION, Tokyo (JP)

(*) Notice: Subject to any disclaimer, the term of this patent is extended or adjusted under 35 U.S.C. 154(b) by 100 days.

(21) Appl. No.: 16/965,381

(22) PCT Filed: Dec. 20, 2018

(86) PCT No.: PCT/JP2018/047058
§ 371 (c)(1),
(2) Date: Jul. 28, 2020

(87) PCT Pub. No.: WO2019/150826
PCT Pub. Date: Aug. 8, 2019

(65) Prior Publication Data
US 2021/0160178 A1 May 27, 2021

(30) Foreign Application Priority Data
Feb. 5, 2018 (JP) .............. JP2018-017993

(51) Int. Cl.
H04L 12/715 (2013.01)
H04L 45/64 (2022.01)
(Continued)

(52) U.S. Cl.
CPC .............. H04L 45/64 (2013.01); H04L 45/38 (2013.01); H04L 45/42 (2013.01)

(58) Field of Classification Search
CPC .......... H04L 45/64; H04L 45/38; H04L 45/42
See application file for complete search history.

(56) References Cited

U.S. PATENT DOCUMENTS 9,807,035 B1* 10/2017 Hanks ............... H04L 49/15
2011/0188373 A1 8/2011 Saito
(Continued)

FOREIGN PATENT DOCUMENTS

CN 104521196 A 4/2015
JP 2011-160171 A 8/2011
(Continued)

OTHER PUBLICATIONS

International Search Report dated Feb. 12, 2019 in PCT/JP2018/047058, 2 pages.

Primary Examiner — Walli Z Butt
(74) Attorney, Agent, or Firm — Oblon, McClelland, Maier & Neustadt, L.L.P.

(57) ABSTRACT

To efficiently distribute data to a plurality of distribution destinations.
According to the present disclosure, a system controller is provided controlling an IP switch that distributes data received from a device on a transmission side to a device on a reception side, the system controller building a plurality of virtual networks in the IP switch and causing data received by any of the virtual networks to be transmitted to respective distribution destinations connected to the virtual networks. With this configuration, data can be efficiently distributed to a plurality of distribution destinations.

15 Claims, 15 Drawing Sheets

(51) Int. Cl.
*H04L 45/00* (2022.01)
*H04L 45/42* (2022.01)

(56) References Cited

U.S. PATENT DOCUMENTS

| | | | |
|---|---|---|---|
| 2015/0256414 A1 | 9/2015 | Koide | |
| 2016/0080481 A1* | 3/2016 | Bisht | H04L 67/1004 370/235 |
| 2016/0134527 A1* | 5/2016 | Kwak | H04L 45/586 370/352 |
| 2017/0244570 A1 | 8/2017 | Shimizu et al. | |
| 2020/0044930 A1* | 2/2020 | Stafford | H04L 41/5025 |

FOREIGN PATENT DOCUMENTS

| | | |
|---|---|---|
| JP | 2015-528650 A | 9/2015 |
| JP | 2016-225783 A | 12/2016 |
| WO | WO 2014/199924 A1 | 12/2014 |

* cited by examiner

SYSTEM CONTROLLER, CONTROLLING AN IP SWITCH INCLUDING PLURAL SDN SWITCHES

TECHNICAL FIELD

The present disclosure relates to a system controller, a network system, and a method in a network system.

BACKGROUND ART

Patent Document 1 below conventionally describes a method and system for controlling a hybrid network including a software-defined network (SDN) switch and a legacy switch.

CITATION LIST

Patent Document

Patent Document 1: Japanese Patent Application National Publication (Laid-Open) No. 2016-521529

SUMMARY OF THE INVENTION

Problems to be Solved by the Invention

However, as described in Patent Document 1 mentioned above, it has been difficult to design a conventional network switch with a high degree of freedom, and it has been difficult to efficiently distribute data to a plurality of distribution destinations.

Thus, it has been desired to efficiently distribute data to a plurality of distribution destinations.

Solutions to Problems

According to the present disclosure, a system controller is provided controlling an IP switch that distributes data received from a device on a transmission side to a device on a reception side, the system controller building a plurality of virtual networks in the IP switch and causing data received by any of the virtual networks to be transmitted to respective distribution destinations connected to the virtual networks.

Furthermore, according to the present disclosure, a network system is provided including: an IP switch that distributes data received from a device on a transmission side to a device on a reception side; and a system controller that controls the IP switch, in which the system controller builds a plurality of virtual networks in the IP switch and causes data received by any of the virtual networks to be transmitted to respective distribution destinations connected to the virtual networks.

Furthermore, according to the present disclosure, a method in a network system is provided for controlling an IP switch that distributes data received from a device on a transmission side to a device on a reception side, the method including building a plurality of virtual networks in the IP switch and causing data received by any of the virtual networks to be transmitted to respective distribution destinations connected to the virtual networks.

Effects of the Invention

As described above, according to the present disclosure, data can be efficiently distributed to a plurality of distribution destinations.

Note that, the above-described effect is not necessarily restrictive, and, in addition to the above-described effect, or in place of the above-described effect, any of effects described in the present specification, or other effects that can be grasped from the present specification may be exhibited.

MODE FOR CARRYING OUT THE INVENTION

Figure 1:
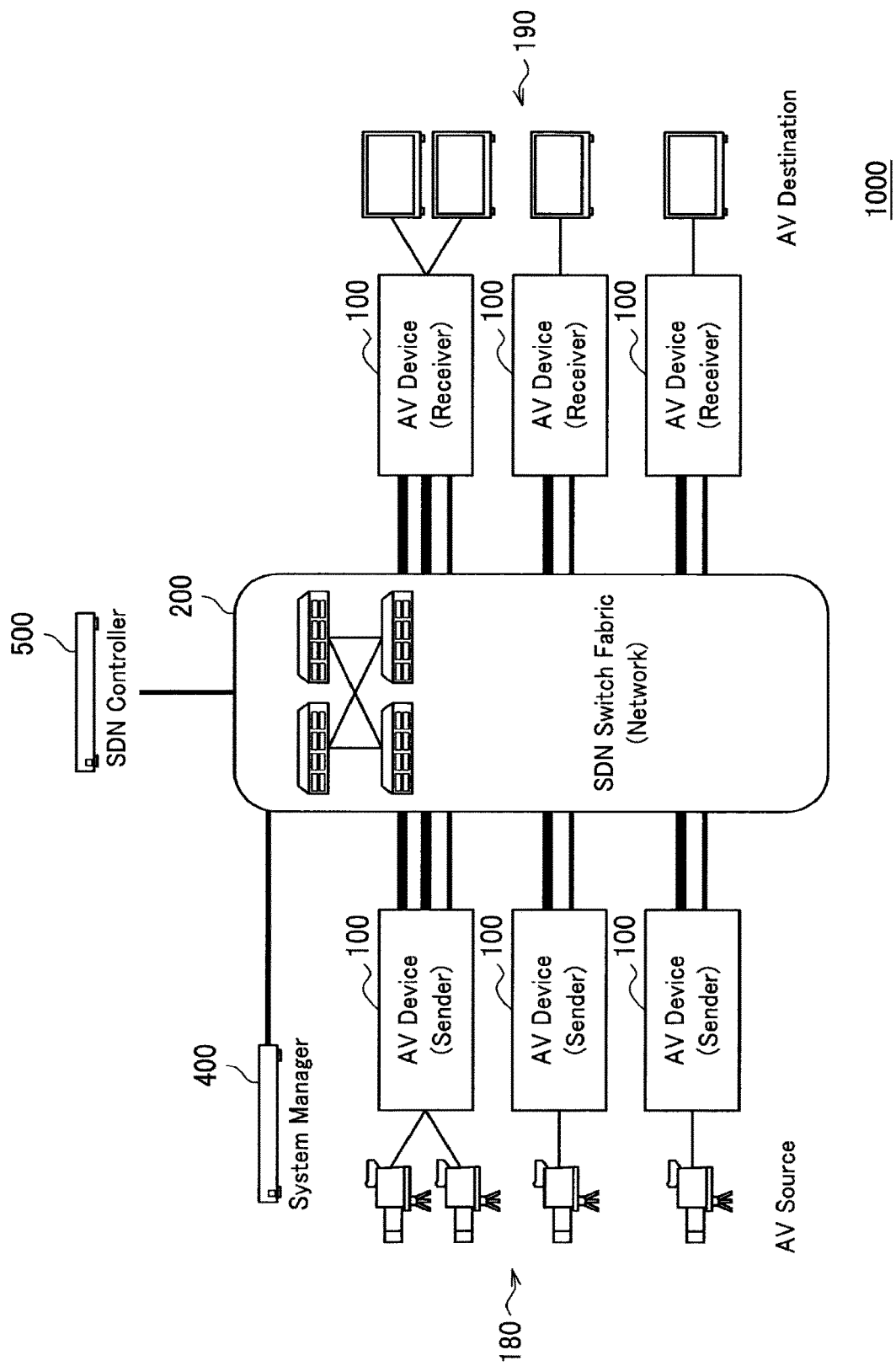
FIG. 1 is a schematic diagram illustrating a schematic configuration of a system according to an embodiment of the present disclosure.

Preferred embodiments of the present disclosure will be described in detail below with reference to the accompanying drawings. Note that, in the present specification and the drawings, components having substantially the same functional configuration are denoted by the same reference signs, and redundant explanations will be omitted.

Note that, the description will be given in the following order.

1. Outline of the present disclosure
2. Application examples of the present disclosure
3. Configuration example of SDN controller
4. Flexible network design using SDN
   4.1. Problem of broadcast distribution in multilink environment 4.2. Broadcast distribution in multilink environment according to the present embodiment
4.3. AV stream load distribution method
5. Visualization of network topology
6. Application example

1. Outline of the Present Disclosure

First, with reference to FIG. 1, a schematic configuration will be described of a system 1000 according to an embodiment of the present disclosure. As illustrated in FIG. 1, the system 1000 includes a plurality of AV devices 100, an IP switch 200, a system manager 400, and an SDN controller (system controller) 500. In FIG. 1, AV stream data and control data are transmitted and received between the AV devices 100 and the IP switch 200. Furthermore, control data is transmitted and received between the IP switch 200 and the system manager 400 or the SDN controller 500. In FIG. 1, between the AV devices 100 and the IP switch 200, and between the IP switch 200 and the system manager 400 or the SDN controller 500, AV stream traffic is indicated by a thick line, and control data traffic is indicated by a thin line. The system manager 400 is a device that controls and switches the AV devices 100.

The plurality of AV devices 100 is, for example, a device such as an IP converter. For example, a device such as a camera is connected as an AV source 180 on the transmission side to the AV device 100 on the transmission side (corresponding to Sender in FIG. 1). Furthermore, a device such as a display is connected as an AV destination 190 on the reception side to the AV device 100 on the reception side (corresponding to Receiver in FIG. 1). In a case where the AV device 100 is an IP converter, the AV device 100 performs interface conversion between the AV source 180 or the AV destination 190 and the IP switch 200. In this example, videos from a plurality of cameras are supplied to a plurality of displays via the IP switch 200.

In the system 1000 of the present embodiment, flexible network design is performed by using Software Defined Networks (SDN). The SDN is architecture in which a network is centrally managed by a network controller (the SDN controller 500) and resources can be dynamically allocated. As a result, flexible traffic load distribution depending on an application can be implemented for an existing network without being restricted by a switch function or protocol.

Furthermore, in the system 1000 of the present embodiment, a network topology is visualized, and improvement of operation management by visualization on a flow basis is implemented.

2. Application Examples of the Present Disclosure

As an example, the system 1000 of the present disclosure assumes provision of audio and video for IP transmission, that is, for AV transmission. In the system 1000, IP transmission is performed between the AV devices 100. As the AV source 180, it is possible to assume an image acquisition and/or acquisition image transmission device, a monitoring camera, and the like, such as a camera, an AV streaming server, a device of a television start system, and a camera of a video conference system. Furthermore, as the AV destination 190, it is possible to assume a PC display, a large display in a video conference or the like, a projector, a recording server, and the like.

In the system 1000, it is assumed that AV streaming is switched by using IP, and it is assumed that an AV signal is converted into IP and transmitted on a network. Furthermore, it is also possible to compress the AV signal before converting it to IP. The AV signal may be converted into IP and transmitted as an RTP stream, or another transmission method may be used. It is also assumed that transmission is performed as a multicast to improve efficiency of the AV signal.

Figure 2:
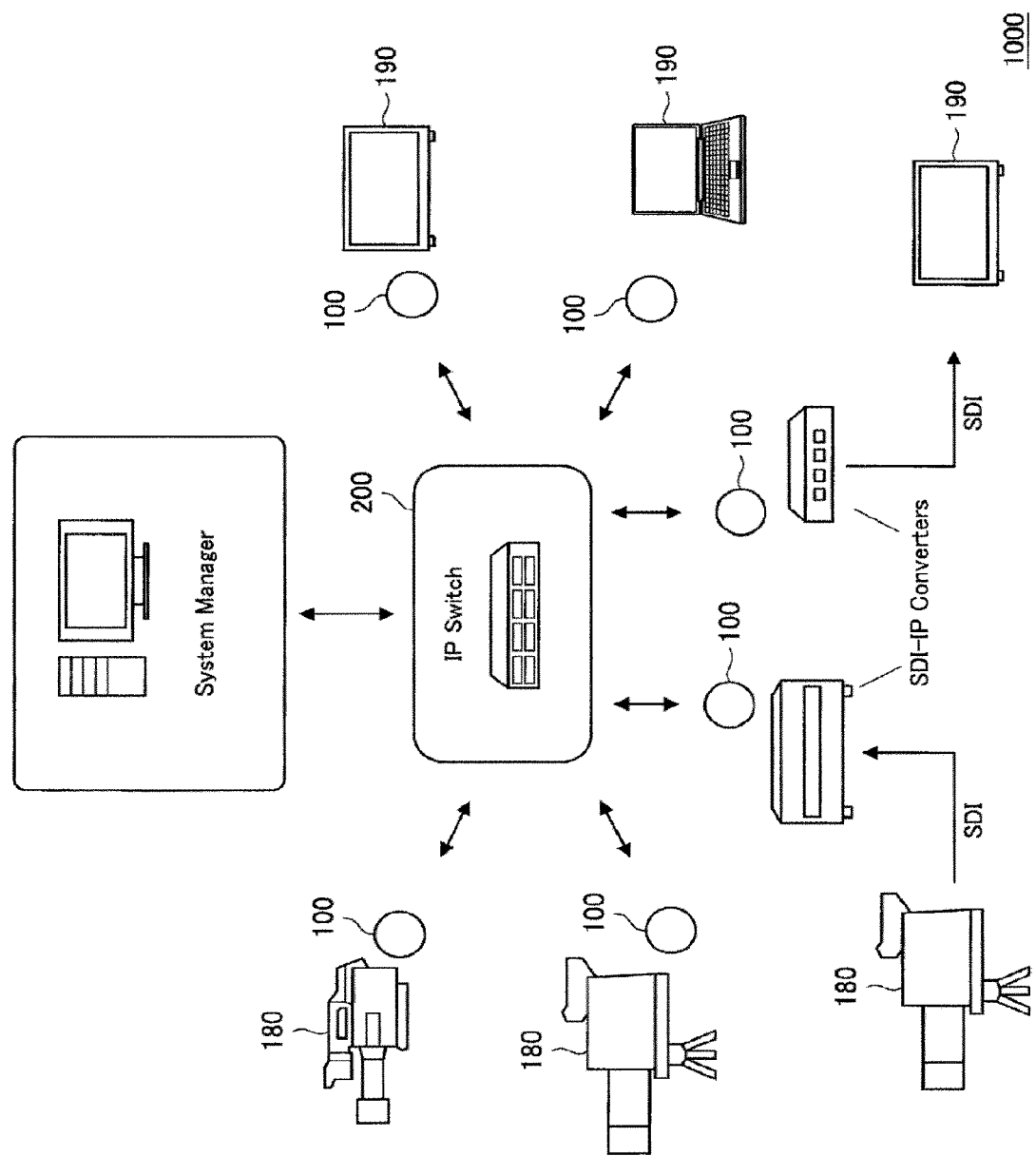
FIG. 2 is a schematic diagram illustrating a specific application example of the present disclosure.
Figure 3:
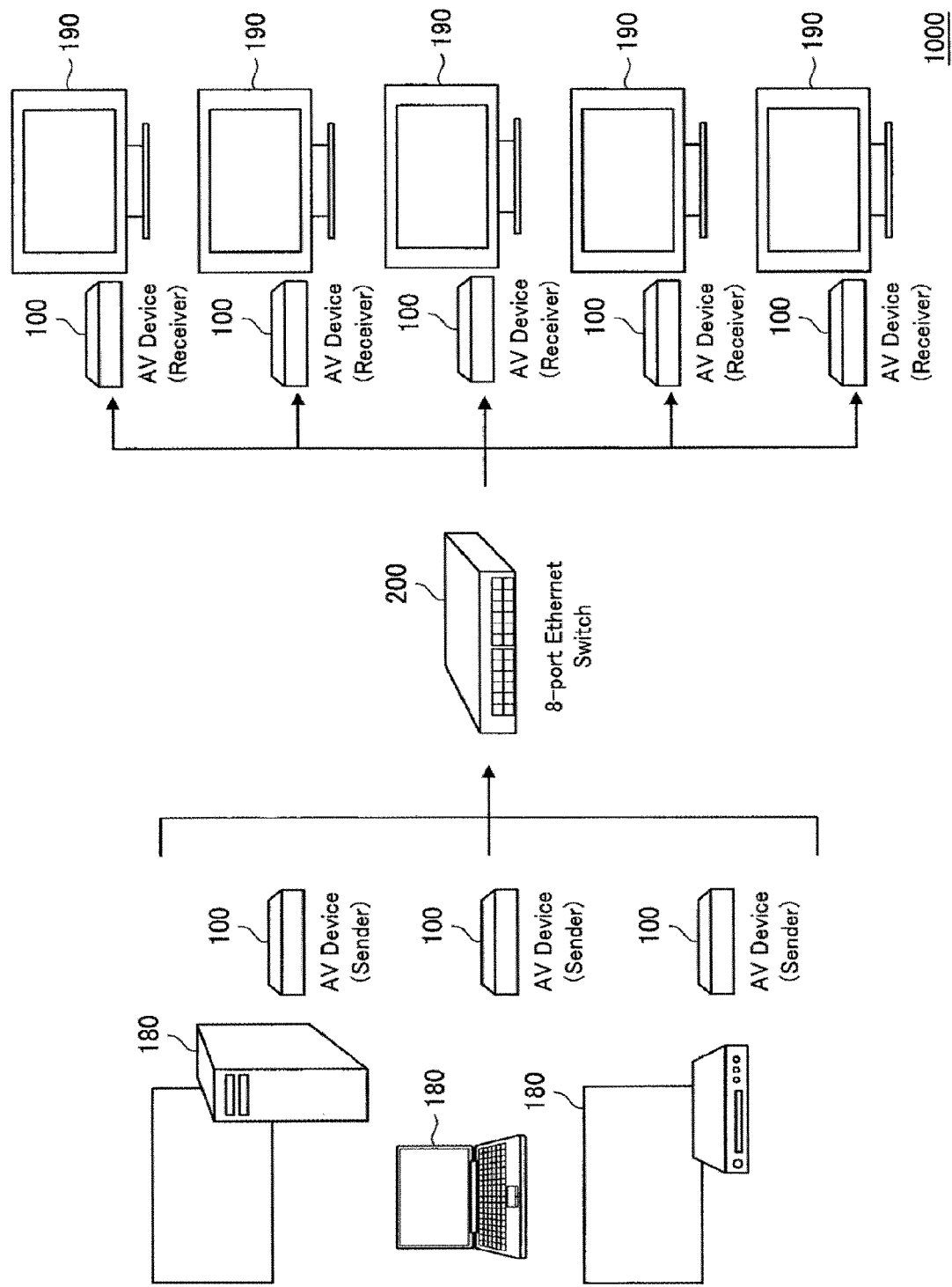
FIG. 3 is a schematic diagram illustrating a specific application example of the present disclosure.

FIGS. 2 and 3 are schematic diagrams illustrating specific application examples of the present disclosure. FIG. 2 illustrates the system 1000 for a broadcast station. In the system 1000 of FIG. 2, the AV sources 180 are devices such as a camera, an AV production switcher, and a streaming server. Furthermore, the AV destinations 190 are devices such as various displays, and storages. In the example illustrated in FIG. 2, a case is assumed where the AV device 100 is incorporated in the AV source 180 or the AV destination 190.

FIG. 3 illustrates the system 1000 for a business operator. In the system 1000 of FIG. 3, the AV sources 180 are devices such as a PC screen, and a streaming server. Furthermore, the AV destinations 190 are devices such as various displays, and storages. In the example illustrated in FIG. 3, the AV devices 100 are configured separately from the AV sources 180 or the AV destinations 190.

Figure 4:
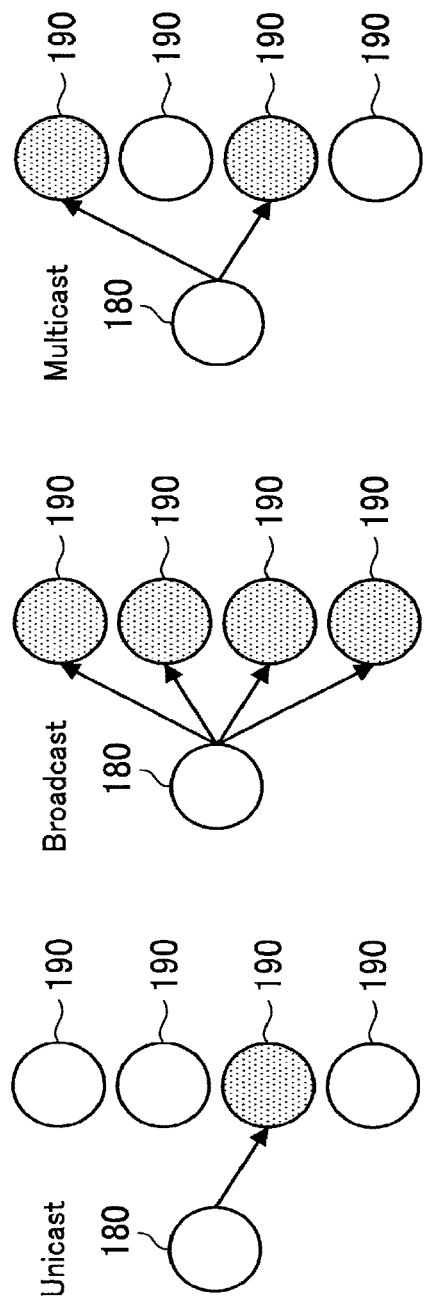
FIG. 4 is a schematic diagram illustrating general unicast, broadcast, and multicast.

FIG. 4 is a schematic diagram illustrating general unicast, broadcast, and multicast. In the unicast, one AV source 180 transmits to one AV destination 190. In the broadcast, one AV source 180 transmits to all other AV destinations 190. In the multicast, one AV source 180 (or multiple AV sources 180) transmits to multiple AV destinations 190.

3. Configuration Example of SDN Controller

Figure 5:
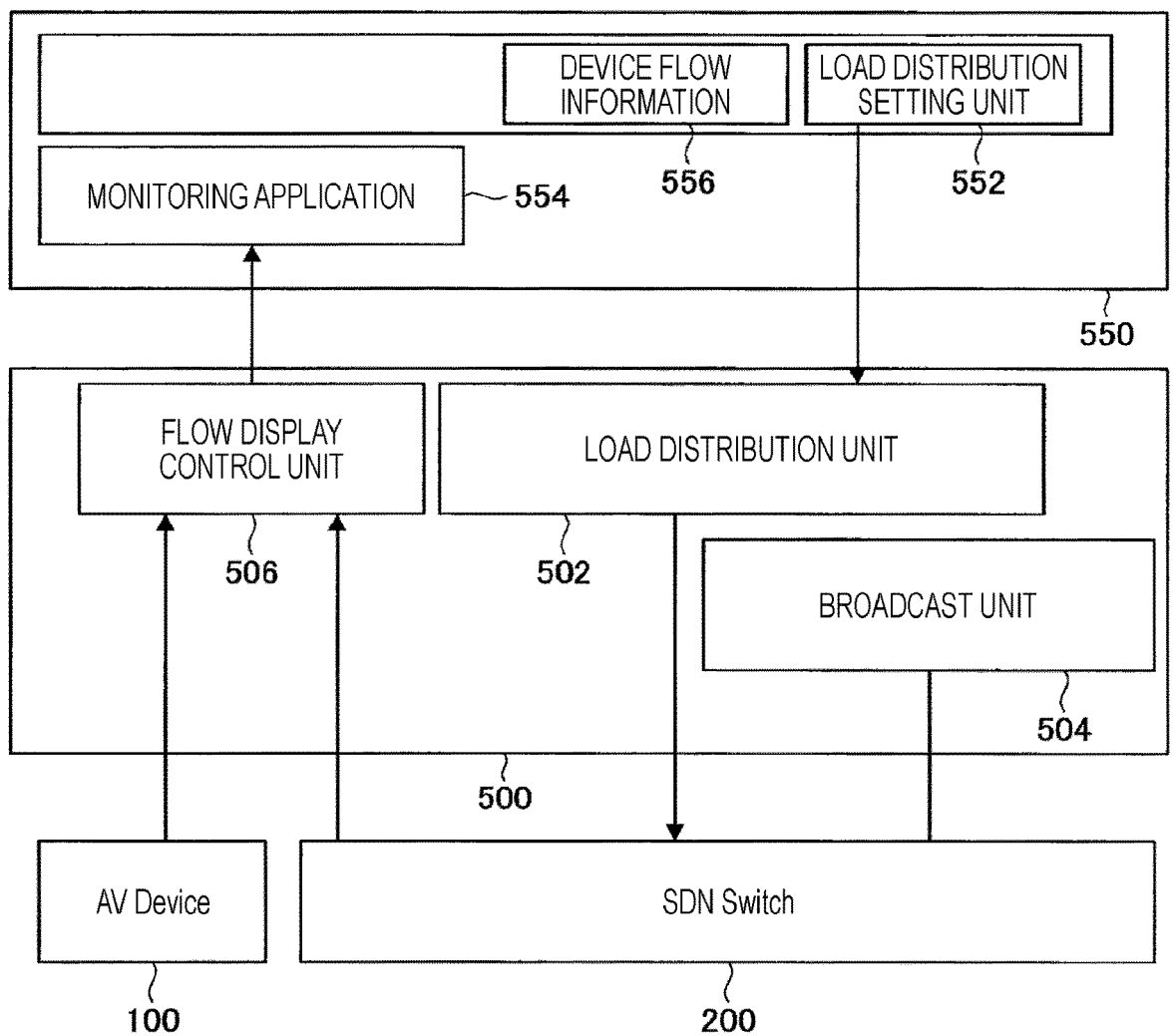
FIG. 5 is a schematic diagram illustrating a configuration of an SDN controller and its periphery.

FIG. 5 is a schematic diagram illustrating a configuration of the SDN controller 500 and its periphery. As illustrated in FIG. 2, the SDN controller 500 includes a load distribution unit 502, a broadcast unit 504, and a flow display control unit 506.

Along with the SDN controller 500, a system controller application 550 is included. The application 550 operates on the SDN controller 500. The application 550 includes a load distribution setting unit 552 and a monitoring application 554 as its functional configuration. Furthermore, the application 550 holds device flow information 556. Each component of the SDN controller 500 and the application 550 can be configured by a central processing unit such as a CPU included in the SDN controller 500 and a program (software) for making this function.

The flexible network design described above is performed by setting a flow entry list of the IP switch 200 so that the broadcast unit 504 of the SDN controller 500 transfers a broadcast packet in a virtual network described later. Furthermore, for example, a user performs setting from the load distribution setting unit 552 of the application 550, and the load distribution unit 502 of the SDN controller 500 sets the IP switch 200, whereby load distribution of the multicast is implemented.

Furthermore, the flow display control unit 506 of the SDN controller 500 controls display in the monitoring application 554 of the application 550 on the basis of information obtained from the IP switch 200 and flow information obtained from the AV device 100 and the like, whereby the visualization of the network topology described above is performed. Note that, a display for the display may be integrated with the SDN controller 500, or may be a separate body.

4. Flexible Network Design Using SDN

4.1. Problem of Broadcast Distribution in Multilink Environment

Figure 6:
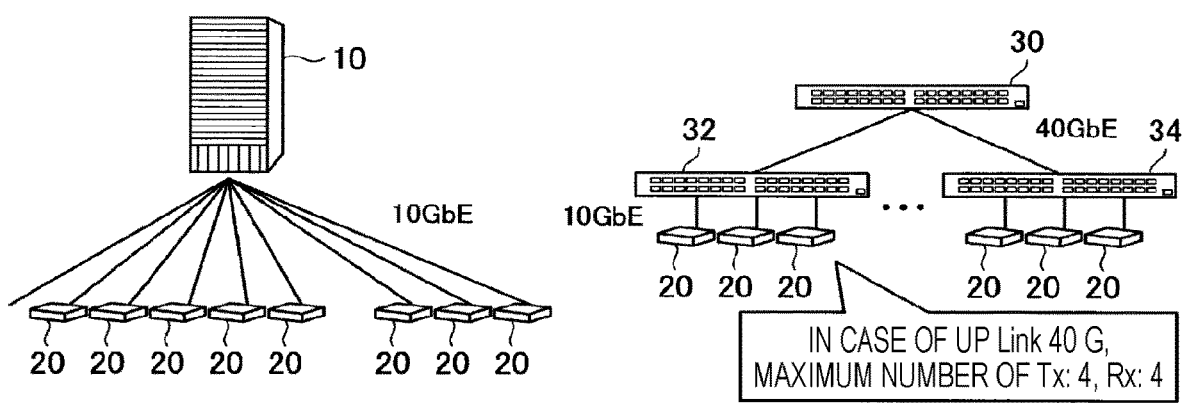
FIG. 6 is a schematic diagram for explaining a problem of broadcast distribution in a multilink environment.

FIG. 6 is a schematic diagram for explaining a problem of broadcast distribution in a multilink environment of a medium-scale to large-scale network. In an existing system, there is a case where broadcast communication is performed between a system controller 10 and IP converters 20. FIG. 6 illustrates a configuration using a large-scale chassis type switch as the system controller 10 (left diagram), and a spine-leaf configuration using a plurality of IP switches 30, 32, and 34 (right diagram).

In a case where the large-scale chassis type switch as illustrated in FIG. 6 is used, there is a problem that the cost of the network is expensive. Furthermore, in a case where the plurality of IP switches 30, 32, and 34 is used, in an existing network of such as an IGMP, transmission data is transmitted to the IP switch 30 of the upper layer, and then is distributed to the IP switches 32 and 34 of the lower layer. However, since the IP switches 30, 32, and 34 are connected together by only one link, and cannot configure a plurality of links, there is a problem that the multicast and the broadcast cannot be compatible with each other in the plural links.

Figure 7:
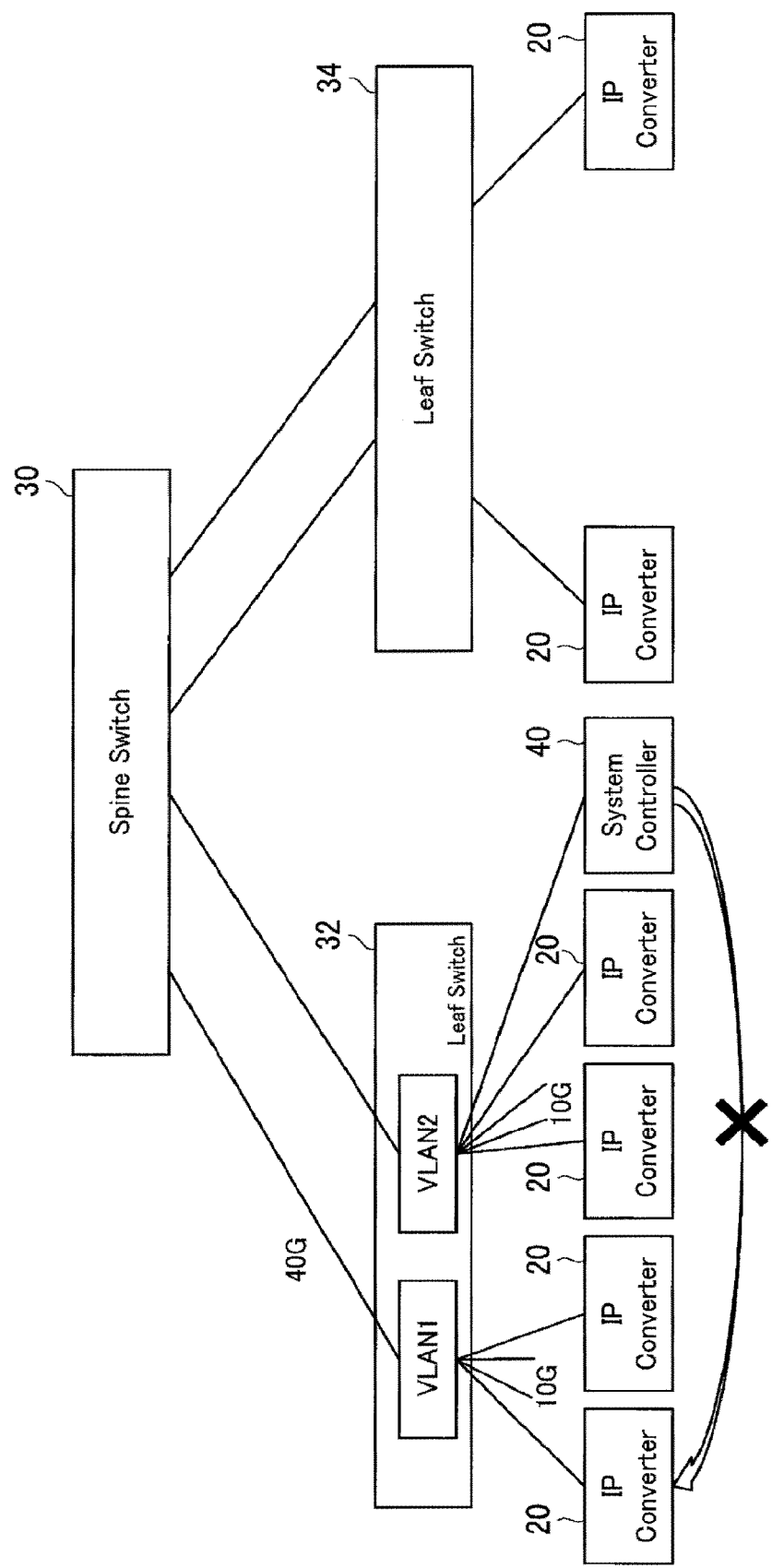
FIG. 7 is a schematic diagram for explaining in detail a problem in a spine-leaf configuration.

FIG. 7 is a schematic diagram for explaining in detail a problem in the spine-leaf configuration. In FIG. 7, the IP switch includes the spine switch 30 and the leaf switches 32 and 34. In a case where data of the video as described above is distributed, in the leaf switch 32, a VLAN is divided for load distribution of the video, and a VLAN 1 and a VLAN 2 are provided. In this case, for example, even if a system controller 40 connected to the VLAN 2 tries to communicate by the broadcast, the system controller 40 cannot communicate (marked by x in FIG. 7) with the IP converters 20 of the other VLAN 1 since the VLAN is divided into the VLAN 1 and the VLAN 2. Thus, in a case where communication is performed by the broadcast, the spine-leaf configuration used in a general medium-scale to large-scale configuration cannot be used.

As described above, the spine-leaf configuration is impractical, while the system is expensive when the large-scale chassis type switch is used.

Figure 8:
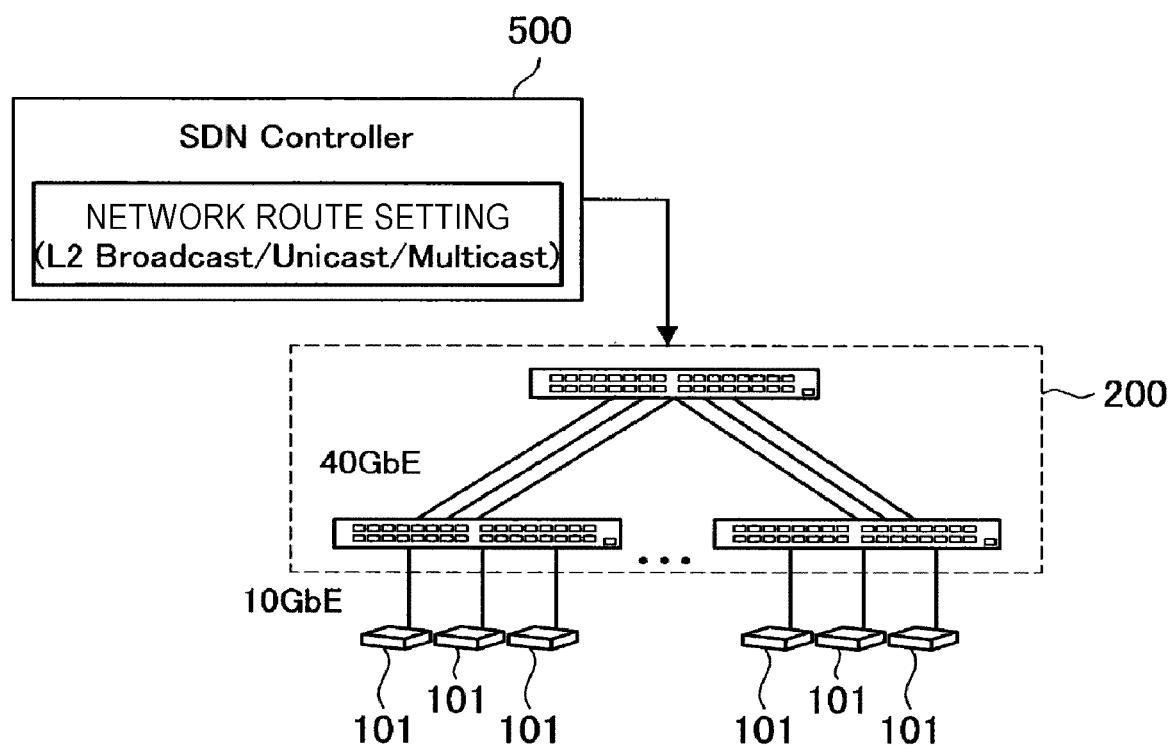
FIG. 8 is a schematic diagram illustrating a configuration of an IP switch according to the present embodiment.

4.2. Broadcast Distribution in Multilink Environment According to the Present Embodiment FIG. 8 is a schematic diagram illustrating a configuration of the IP switch 200 according to the present embodiment. In the present embodiment, the switch is made to have multiple stages, and cost reduction is achieved by load distribution by plural links. The restrictions of the switch function and protocol are removed by the SDN, so that flexible traffic load distribution depending on the application is enabled. Furthermore, the unique configuration of the SDN controller 500 enables broadcast and multicast communication even on the plural links between switches.

When the right diagram of FIG. 6 is compared with FIG. 8, in the right diagram of FIG. 6, in a case where the capacity of one uplink between the spine and the leaf is 40 giga (G), the number of IP converters 20 per each of the leaf switches 32 and 34 is four on the transmission side (Tx) and four on the reception side (Rx). However, the capacity of each of the IP converters 20 is 10 G.

On the other hand, in the case of FIG. 8, in a case where the capacity of each of three uplinks between the spine and the leaf is 40 giga (G), the number of AV devices 101 (corresponding to the IP converters 20 in FIG. 6) per leaf is 12 on the transmission side (Tx) and 12 on the reception side (Rx). Thus, the number of IP converters per leaf increases from 8 to 48. Furthermore, since it can be implemented by a multi-stage switch without using the large-scale chassis type switch as illustrated in the left diagram of FIG. 6, the cost of the hardware can be reduced.

Hereinafter, the present embodiment will be specifically described. In the present embodiment, a broadcast packet is transferred in the IP switch 200 by building a virtual network in the network topology in which plural links exist between switches.

Figure 9:
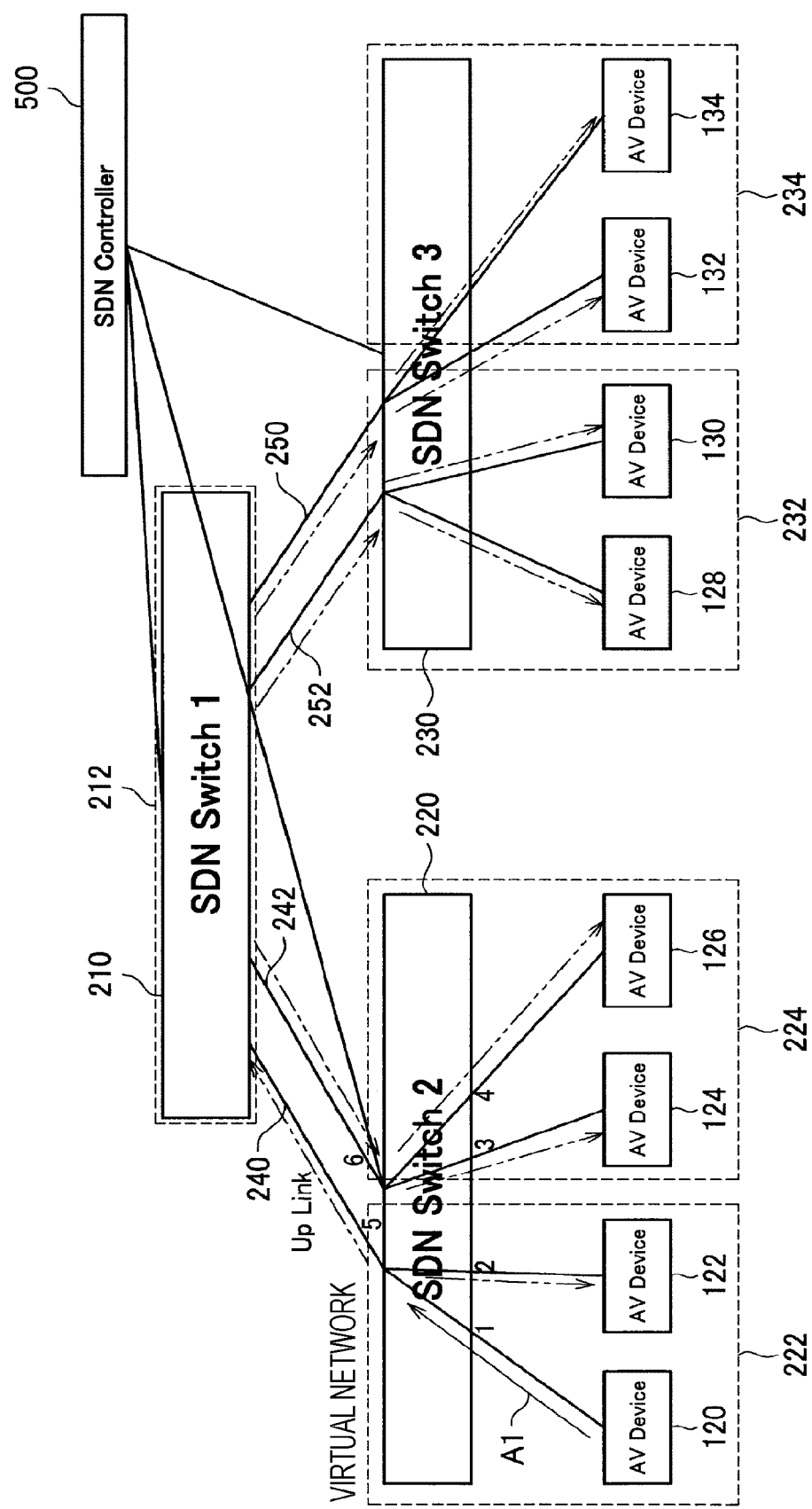
FIG. 9 is a schematic diagram illustrating broadcast communication in a multilink environment according to the present embodiment.

FIG. 9 is a schematic diagram illustrating broadcast communication in a multilink environment according to the present embodiment. As illustrated in FIG. 9, the IP switch 200 includes SDN switches 210, 220, and 230 arranged in multiple stages (two stages in FIG. 9). Note that, in a case where the IP switch 200 includes SDN switches arranged in multiple stages, for example, two SDN switches are connected in a lower layer of the SDN switch 220 illustrated in FIG. 9, and a plurality of AV device is connected in a lower layer of each of the two SDN switches.

The SDN switch 210 and the SDN switch 220 are connected to each other by two uplinks (Up Link) 240 and 242. Furthermore, the SDN switch 210 and the SDN switch 230 are connected to each other by two uplinks (Up Link) 250 and 252.

In the SDN switch 220, two virtual networks 222 and 224 are built corresponding to the two uplinks 240 and 242. Similarly, in the SDN switch 230, two virtual networks 232 and 234 are built corresponding to the two uplinks 250 and 252. Furthermore, one virtual network 212 is built in the SDN switch 210.

As described above, in the present embodiment, a virtual network is defined for each uplink, and endpoints are separated for each uplink. Then, flow control is performed so that flooding of the broadcast packet is performed in the virtual network.

In FIG. 9, a port of the SDN switch 220 to which an AV device 120 is connected is set as a port "1", and a port of the SDN switch 220 to which an AV device 122 is connected is set as a port "2". Furthermore, a port of the SDN switch 220 to which an AV device 124 is connected is set as a port "3", and a port of the SDN switch 220 to which an AV device 126 is connected is set as a port "4".

Furthermore, in FIG. 9, a port of the SDN switch 220 to which the uplink 240 is connected is set as a port "5", and a port of the SDN switch 220 to which the uplink 242 is connected is set as a port "6". At this time, a flow entry list of the SDN switch 220 is defined as follows.

IF Broadcast Packet AND In_port=Port1 Output=Port2, Port5

IF Broadcast Packet AND In_port=Port2 Output=Port1, Port5

IF Broadcast Packet AND In_port=Port5 Output=Port1, Port2

IF Broadcast Packet AND In_port=Port3 Output=Port4, Port6

IF Broadcast Packet AND In_port=Port4 Output=Port3, Port6

IF Broadcast Packet AND In_port=Port6 Output=Port3, Port4

Similar settings are made in the SDN switch 210 and the SDN switch 230. As described above, for example, according to the first line of the above-described flow entry list, the broadcast packet (indicated by a solid arrow A1 in FIG. 9) sent from the AV device 120 to the SDN switch 220 enters the SDN switch 220 from the port "1" of the SDN switch 220, and is output from the port "2" and the port "5", and is sent to the SDN switch 210 and the IP converter 122. In the SDN switch 210 and the SDN switch 230, a similar flow is performed, whereby the broadcast packet sent from the AV device 120 to the SDN switch 220 is broadcast-distributed to the AV devices 122, 124, 126, 128, 130, 132, and 134 in accordance with a flow of an arrow indicated by a chain line. Note that, in this example, the AV device 120 may be, for example, an AV source such as a camera, and the AV devices 122, 124, 126, 128, 130, 132, and 134 may be AV destinations such as displays. The data to be broadcast-distributed may be control data or an AV stream. Furthermore, in a case where the control data is broadcast-distributed in a case where the AV devices 122, 124, 126, 128, 130, 132, and 134 are devices such as displays, the AV devices 122, 124, 126, 128, 130, 132, and 134 may be devices on the transmission side. Furthermore, the AV device 120 on the transmission side may be a device such as the system manager 400 or the SDN controller 500.

The broadcast distribution as described above can be implemented by the broadcast unit 504 of the SDN controller 500 setting the flow entry list of the IP switches (the SDN switches 210, 220, and 230) on the basis of the virtual network. The IP switches (the SDN switches 210, 220, and 230) set a route on the basis of the flow entry list. As a result, a free route design by the SDN controller 500 becomes possible.

4.3. AV Stream Load Distribution Method

Figure 10:
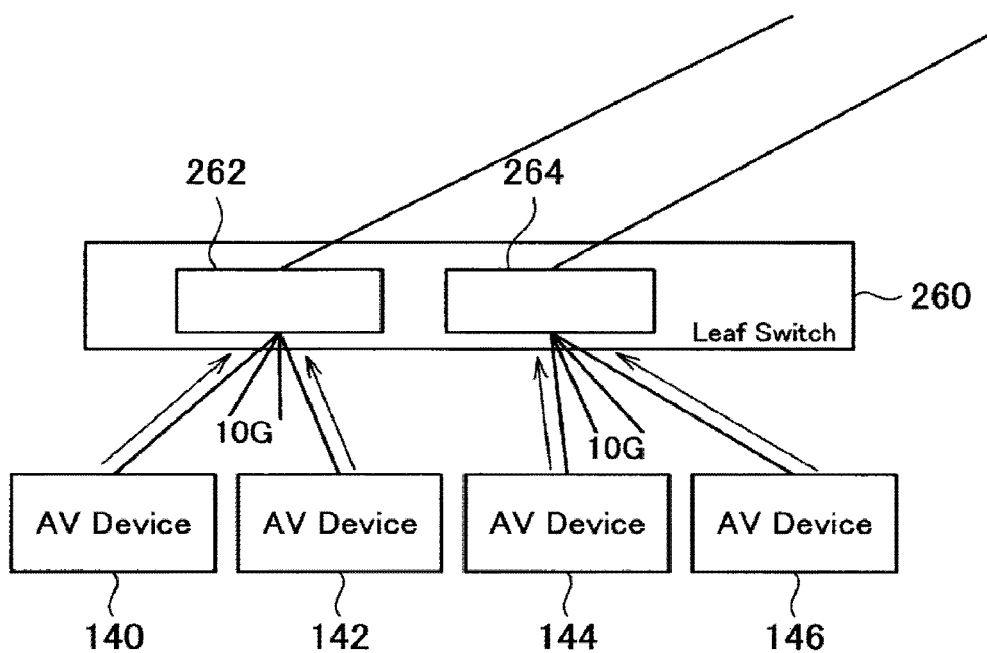
FIG. 10 is a schematic diagram illustrating a state in which AV devices are connected to a leaf switch of the IP switch.
Figure 11:
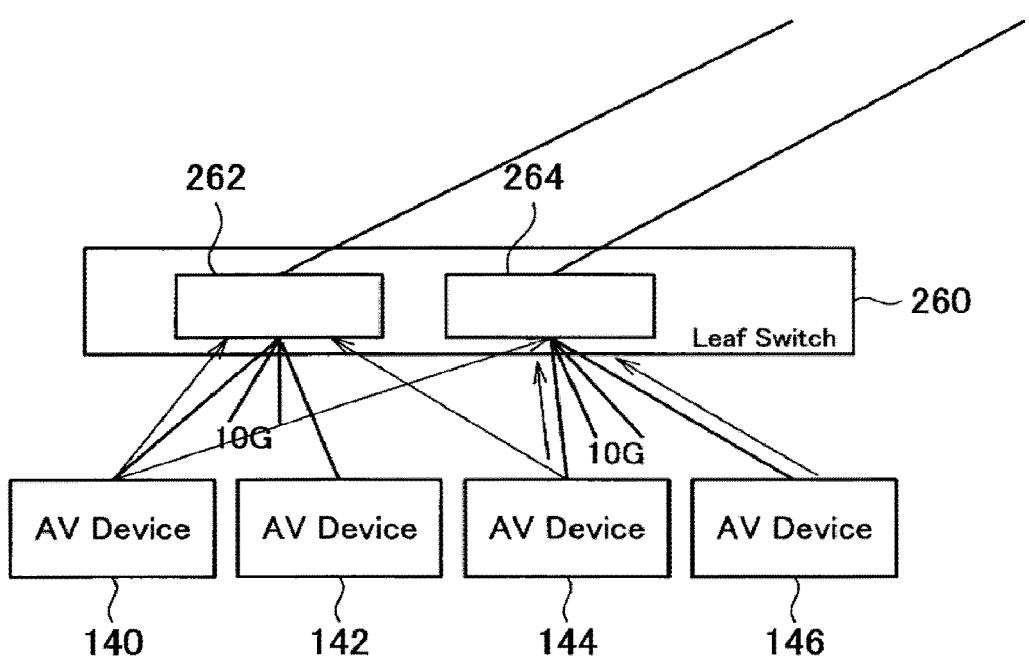
FIG. 11 is a schematic diagram illustrating a state in which the AV devices are connected to the leaf switch of the IP switch.

Next, an AV stream load distribution method according to the present embodiment will be described. FIGS. 10 and 11 are schematic diagrams for explaining the AV stream load distribution method according to the present embodiment. FIGS. 10 and 11 are schematic diagrams illustrating a state in which AV devices 140, 142, 144, and 146 are connected to a leaf switch 260 of the IP switch 200.

FIG. 10 is a schematic diagram illustrating load distribution for each interface. In the example illustrated in FIG. 10, data transmitted from the AV devices 140 and 142 flow through links connected to a virtual network 262, and are sent to a switch on the upper stage. Furthermore, data transmitted from the AV devices 144 and 146 flow through links connected to a virtual network 264, and are sent to the switch on the upper stage. By dividing the virtual networks 262 and 264 for each of the AV devices 140, 142, 144, and 146, a dynamic change is possible depending on a situation as compared with a conventional VLAN system. Furthermore, FIG. 11 is a schematic diagram illustrating load distribution for each stream. As illustrated in FIG. 11, data transmitted from the AV devices 140, 142, 144, and 146 are transmitted to different virtual networks 262 and 264 in the leaf switch 260 for each individual stream. As a result, load distribution can be performed for each stream. Note that, the reference numeral 262 illustrated in FIG. 10 may be a switch, and a network including the switch and the AV devices 140 and 142 may be used as a virtual network. Similarly, the reference numeral 264 illustrated in FIG. 10 may be a switch, and a network including the switch and the AV devices 144 and 146 may be used as a virtual network. This also applies to FIG. 11.

As illustrated in FIGS. 10 and 11, the load distribution of the AV stream is performed explicitly with a UI or a setting file as a base. Load distribution is performed on the basis of the size of the stream, and the bandwidth of the uplink and trunk port. Load distribution of the downlink is performed on a host basis.

Figure 12:
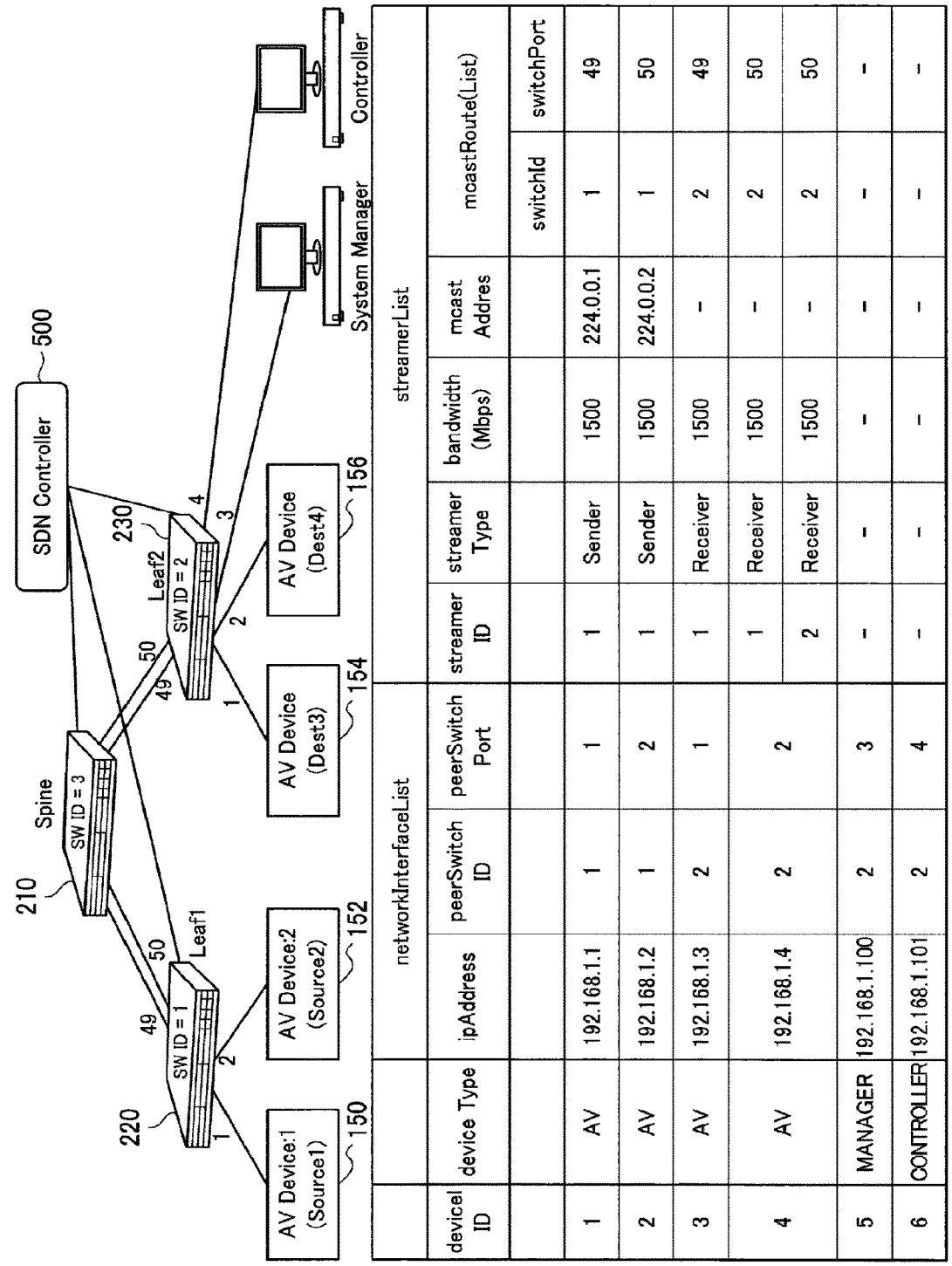
FIG. 12 is a schematic diagram illustrating a specific example of AV stream load distribution.

FIG. 12 is a schematic diagram illustrating a specific example of AV stream load distribution. The configuration of the IP switch 200 is similar to that of FIG. 9. As described above, the load distribution of the multicast is specified to the SDN controller 500 by the application 550. The load distribution specified by the application 550 is indicated in a table in the lower part of FIG. 12. The table can also be specified by the user operating the UI of the application 550.

In FIG. 12, an ID of the IP switch 220 is set as "1", an ID of the IP switch 230 is set as "2", and an ID of the IP switch 210 is set as "3". Furthermore, the IP switches 210, 220, and 230 each include ports that are connected to AV devices 150, 152, 154, and 156. Furthermore, IDs of the AV devices 150, 152, 154, and 156 are set as "1", "2", "3", and "4", respectively. In the table indicated in the lower part of FIG. 12, in a network interface list (networkInterfaceList), for each of devices connected to the IP switches, such as the AV devices 150, 152, 154, and 156, an IP address (ipAddress) of the AV device of each ID, an ID (peerSwitch ID) and a port number (peerSwitchPort) of the IP switch connected, and the like are defined. Furthermore, in a streamer list (streamerList), an ID of the stream (streamer), a streamer type (Sender or Receiver), bandwidth (bandwidth), a multicast destination address (mcastAddres), an ID of the IP switch connected (switch ID), an output port (switchPort), and the like are defined.

In the AV stream load distribution, the load distribution unit 502 of the SDN controller 500 performs route setting on the basis of the table indicated in FIG. 12. For example, in the case of an AV stream transmitted from the AV device 150 with ID=1, the route setting is performed as follows.

If In_port=Port1 AND Multicast_Address=224.0.0.1 Output=Port49

If In_port=Port2 AND Multicast_Address=224.0.0.2 Output=Port50

The route setting is performed on the basis of the size of the stream, and the bandwidth of the uplink and trunk port. Each of the IP switches 210, 220, and 230 recognizes information in the table of FIG. 12 and performs load distribution. Thus, the load distribution unit 502 of the SDN controller 500 performs the route setting on the basis of the table indicated in FIG. 12, whereby the load of the AV stream can be distributed.

5. Visualization of Network Topology

Next, visualization of the network topology will be described. In an existing network, monitoring cannot be performed on a data flow basis, for example, on a multicast basis. On the other hand, by using the SDN, flow information can be managed by the IP switch 200, so that a data flow monitoring function can be implemented. In the present embodiment, the network topology between the AV devices is visualized by using the SDN and centrally managing the network with the SDN controller 400.

The SDN controller 500 can acquire data flow statistical information from the IP switch 200. That is, the SDN controller 500 can acquire data flow information from the leaf switch and spine switch constituting the IP switch 200.

Moreover, the SDN controller 500 can acquire connection information from an end device (each AV device) and flow information output by each end device. The flow display control unit 506 of the SDN controller 500 performs control for displaying flow information between end devices on the basis of the data flow information obtained from the IP switch and the flow information output from each AV device obtained from the AV device.

Furthermore, the flow display control unit 506 performs control for separating and displaying flow information for each network traffic. For example, separate display is performed for each of a multicast traffic list, a unicast traffic list, and a broadcast traffic list.

Moreover, UI information is displayed by referring to route information of the IP switch 200 and a transfer table, and a route is determined by looking at the amount of traffic actually flowing through the IP switch 200, and is displayed.

Figure 13:
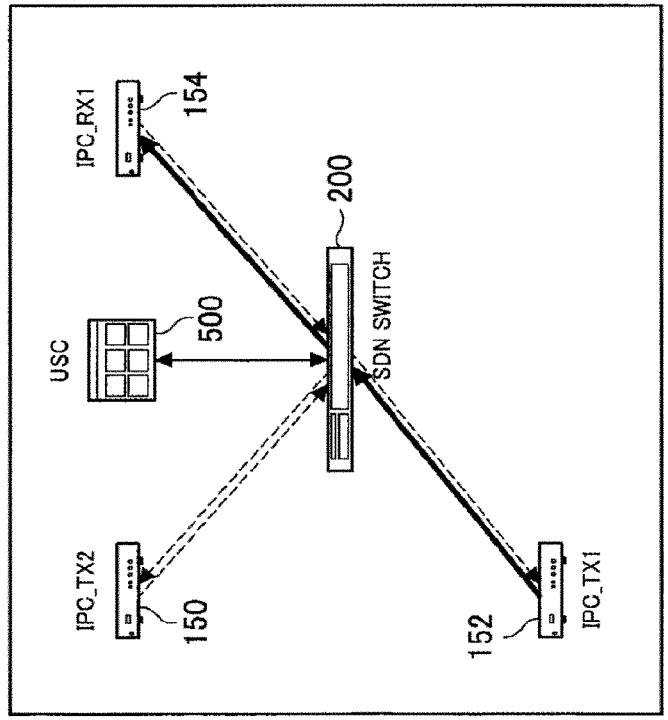
FIG. 13 is a schematic diagram illustrating information visualizing a network topology, created by the SDN controller.

FIG. 13 is a schematic diagram illustrating display information visualizing the network topology, created by the flow display control unit 506 of the SDN controller 500. The information illustrated in FIG. 13 is displayed on a display or the like on the basis of the route information, and depending on a flow of data of actual traffic. The SDN controller 500 can create the information illustrated in FIG. 13 by grasping a flow of a data flow in the IP switch 200 and acquiring the flow information output by the end device.

As illustrated in FIG. 13, the system configuration is displayed on the left side. A state is illustrated in which the AV devices 150, 152, and 154 are connected to each other via the IP switch 200, and the SDN controller 500 is connected to the IP switch 200.

Furthermore, in the upper right part of FIG. 13, for example, a bit rate (=8,560,557,792 bps) and an amount of data (=53911911992 bytes) of a multicast AV stream of the AV device 152 (IPC_TX1) are indicated as a flow list. Furthermore, a bit rate (=384 bps) and an amount of data (=3006300) of broadcast data of control data from the AV device 154 (IPC_RX1) are indicated. Note that, data flow information of the AV device may be directly acquired by the flow display control unit 506 of the SDN controller 500, or the flow display control unit 506 may acquire information acquired as the device flow information 556 by the application 550.

Furthermore, flow information in each switch of the IP switch 200 is indicated in the lower right part of FIG. 13. Thus, since both data flow information in the AV devices 150, 152, and 154, and data flow information in the IP switch 200 are visualized by using the UI, the user can recognize a data flow flowing from an AV device on the transmission side through the IP switch 200 to an AV device on the reception side. Furthermore, since a change in the network system is reflected in the information visualizing the network topology illustrated in FIG. 13, even in a case where an AV device is further added, it is possible to recognize a data flow flowing from the AV device on the transmission side through the IP switch 200 to the AV device on the reception side.

6. Application Example

The technology according to the present disclosure can be applied to various products. For example, the technology according to the present disclosure may be applied to an operation room system.

Figure 14:
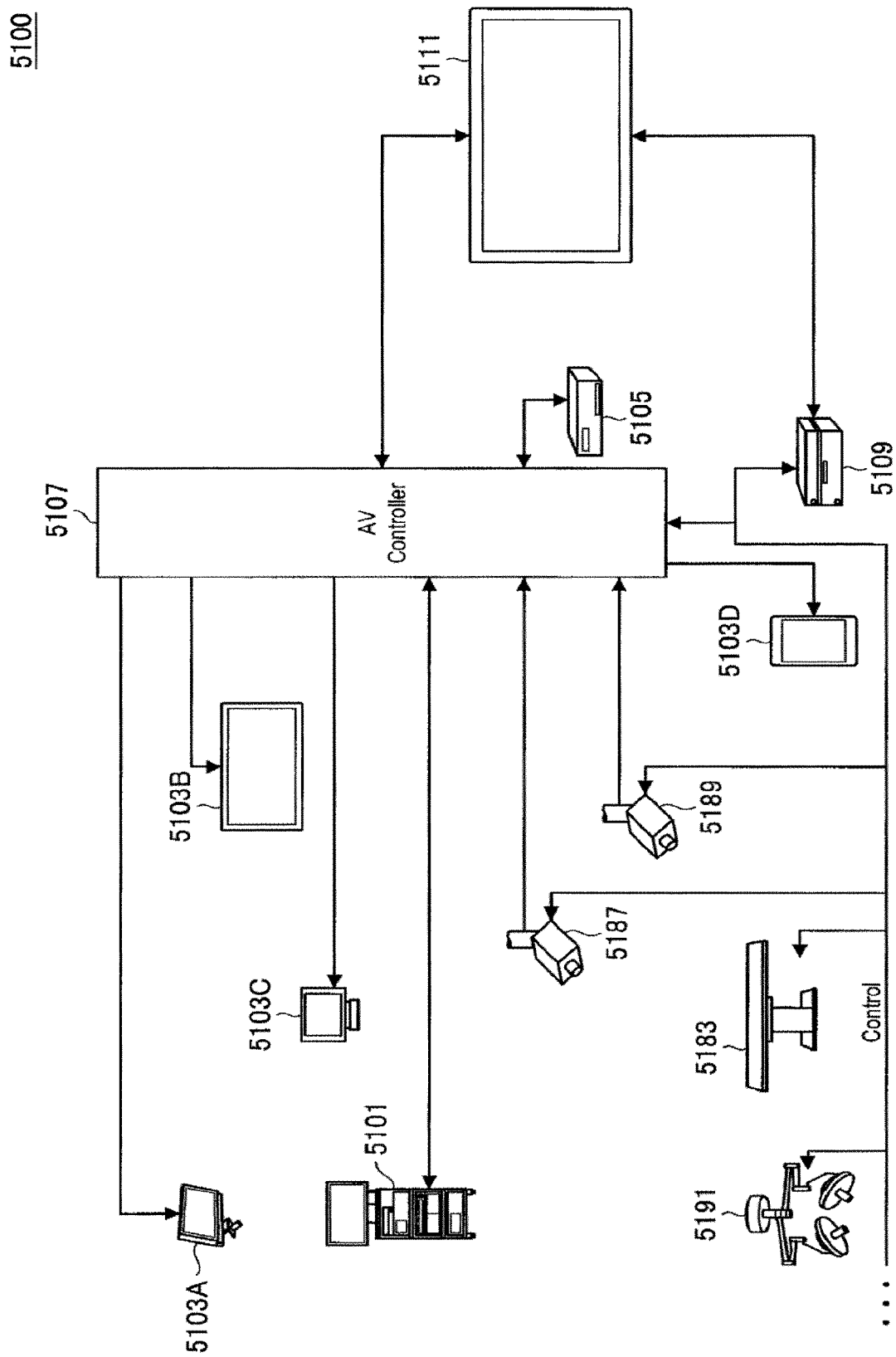
FIG. 14 is a diagram schematically illustrating an overall configuration of an operation room system.

FIG. 14 is a diagram schematically illustrating an overall configuration of an operation room system 5100 to which the technology according to the present disclosure can be applied. Referring to FIG. 14, in the operation room system 5100, devices installed in an operation room are connected to each other to be able to cooperate with each other via an audiovisual controller (AV controller) 5107 and an operation room control device 5109.

Various devices can be installed in the operation room. FIG. 14 illustrates, as an example, various devices 5101 for endoscopic surgery, a ceiling camera 5187 provided on the ceiling of the operation room and imaging an area at hand of a surgeon, an operation room camera 5189 provided on the ceiling of the operation room and imaging a state of the entire operation room, a plurality of display devices 5103A to 5103D, a recorder 5105, a patient bed 5183, and an illumination 5191.

Here, among these devices, the devices 5101 belong to an endoscopic surgical system 5113 described later, and includes an endoscope, a display device that displays an image captured by the endoscope, and the like. Each device belonging to the endoscopic surgical system 5113 is also referred to as a medical device. On the other hand, the display devices 5103A to 5103D, the recorder 5105, the patient bed 5183, and the illumination 5191 are devices provided in, for example, the operation room, separately from the endoscopic surgical system 5113. Each device that does not belong to the endoscopic surgical system 5113 is also referred to as a non-medical device. The audiovisual controller 5107 and/or the operation room control device 5109 control operations of these medical devices and non-medical devices in cooperation with each other.

The audiovisual controller 5107 comprehensively controls processing regarding image display in the medical devices and non-medical devices. Specifically, among the devices included in the operation room system 5100, the devices 5101, the ceiling camera 5187, and the operation room camera 5189 each can be a device (hereinafter also referred to as a transmission source device) having a function of transmitting information (hereinafter also referred to as display information) to be displayed during surgery. Furthermore, the display devices 5103A to 5103D each can be a device (hereinafter also referred to as an output destination device) to which the display information is output. Furthermore, the recorder 5105 can be a device corresponding to both the transmission source device and the output destination device. The audiovisual controller 5107 has functions of controlling operations of the transmission source device and the output destination device, to acquire the display information from the transmission source device and transmit the display information to the output destination device for display or recording. Note that, the display information is various images captured during the surgery, and various types of information regarding the surgery (for example, patient's physical information, the past examination results, information about a surgical method, and the like) and the like.

Specifically, information about the image of the surgical portion in a body cavity of the patient captured by the endoscope is transmitted as display information from the devices 5101 to the audiovisual controller 5107. Furthermore, information about the image of the area at hand of the surgeon captured by the ceiling camera 5187 can be transmitted as display information from the ceiling camera 5187. Furthermore, information about the image indicating the state of the entire operation room captured by the operation room camera 5189 can be transmitted as display information from the operation room camera 5189. Note that, in a case where there is another device having an imaging function in the operation room system 5100, the audiovisual controller 5107 may acquire information about an image captured by the other device from the other device, as display information.

Alternatively, for example, information about these images captured in the past is recorded in the recorder 5105 by the audiovisual controller 5107. The audiovisual controller 5107 can acquire information about the image captured in the past from the recorder 5105 as display information. Note that, various types of information regarding surgery may also be recorded in advance in the recorder 5105.

The audiovisual controller 5107 causes at least one of the display devices 5103A to 5103D that are output destination devices to display the acquired display information (in other words, images captured during the surgery, and various types of information regarding the surgery). In the illustrated example, the display device 5103A is a display device installed to be suspended from the ceiling of the operation room, the display device 5103B is a display device installed on the wall of the operation room, the display device 5103C is a display device installed on a desk in the operation room, and the display device 5103D is a mobile device (for example, a tablet personal computer (PC)) having a display function.

Furthermore, although illustration is omitted in FIG. 14, the operation room system 5100 may include devices outside the operation room. The devices outside the operation room can be, for example, a server connected to a network built inside and outside a hospital, a PC used by a medical staff, a projector installed in a conference room of the hospital, and the like. In a case where such an external device is outside the hospital, the audiovisual controller 5107 can also cause a display device of another hospital to display the display information via a video conference system or the like, for telemedicine.

The operation room control device 5109 comprehensively controls processing other than the processing regarding the image display in the non-medical devices. For example, the operation room control device 5109 controls drive of the patient bed 5183, the ceiling camera 5187, the operation room camera 5189, and the illumination 5191.

A centralized operation panel 5111 is provided in the operation room system 5100, and a user can give an instruction about image display to the audiovisual controller 5107 via the centralized operation panel 5111, or an instruction about operation of the non-medical device to the operation room control device 5109. The centralized operation panel 5111 is configured as a touch panel provided on the display surface of the display device.

Figure 15:
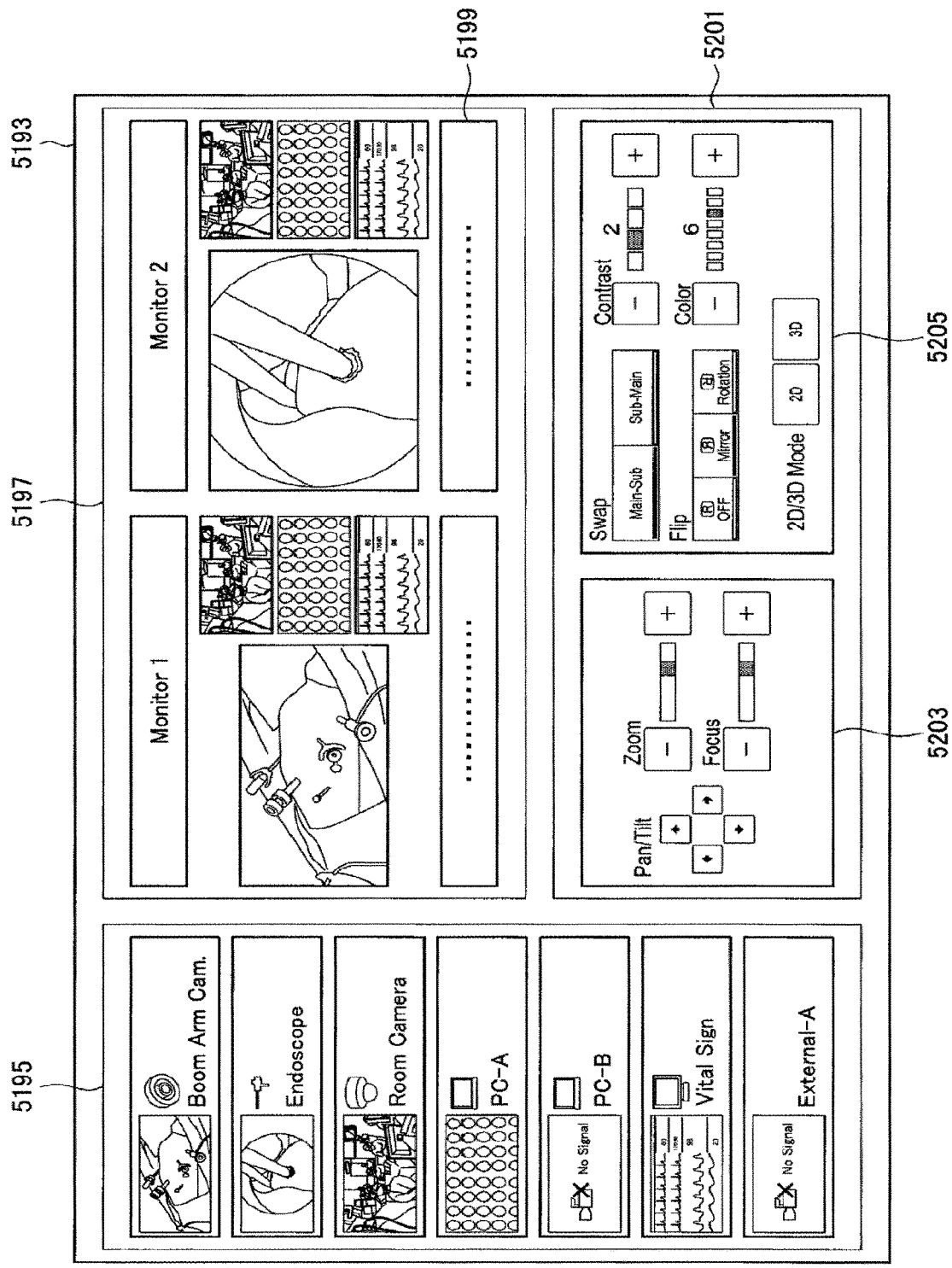
FIG. 15 is a diagram illustrating a display example of an operation screen on a centralized operation panel.

FIG. 15 is a diagram illustrating a display example of an operation screen on the centralized operation panel 5111. In FIG. 15, as an example, the operation screen is illustrated corresponding to a case where the operation room system 5100 is provided with two display devices as the output destination devices. Referring to FIG. 15, an operation screen 5193 is provided with a transmission source selection area 5195, a preview area 5197, and a control area 5201.

In the transmission source selection area 5195, the transmission source devices included in the operation room system 5100 and respective thumbnail screens representing the display information of the transmission source devices are displayed in association with each other. The user can select the display information to be displayed on the display device from any of the transmission source devices displayed in the transmission source selection area 5195.

In the preview area 5197, previews are displayed of screens displayed on the respective two display devices (Monitor 1 and Monitor 2) that are output destination devices. In the illustrated example, four images are PinP-displayed in one display device. The four images correspond to the display information transmitted from the transmission source device selected in the transmission source selection area 5195. Among the four images, one is displayed relatively large as a main image, and the remaining three are displayed relatively small as sub-images. The user can switch the main image and the sub-images with each other by appropriately selecting one of four areas in which the respective images are displayed. Furthermore, a status display area 5199 is provided below an area in which the four images are displayed, and a status regarding the surgery (for example, an elapsed time of the surgery, the patient's physical information, and the like) is displayed in the area as appropriate.

The control area 5201 is provided with a transmission source operation area 5203 in which graphical user interface (GUI) components are displayed for performing operation to the transmission source device, and an output destination operation area 5205 in which GUI components are displayed for performing operation to the output destination device. In the illustrated example, in the transmission source operation area 5203, the GUI components are provided for performing various operations (pan, tilt, and zoom) to a camera in the transmission source device having an imaging function. The user can operate the operation of the camera in the transmission source device by appropriately selecting these GUI components. Note that, although not illustrated, in a case where the transmission source device selected in the transmission source selection area 5195 is a recorder (in other words, in a case where an image recorded in the recorder in the past is displayed on the preview area 5197), a GUI component for performing operations such as reproduction, reproduction stop, rewind, and fast-forward of the image can be provided in the transmission source operation area 5203.

Furthermore, in the output destination operation area 5205, the GUI components are provided for performing various operations (swap, flip, color adjustment, contrast adjustment, switching between 2D display and 3D display) to a display on the display device that is the output destination device. The user can operate the display on the display device by appropriately selecting these GUI components.

Note that, the operation screen displayed on the centralized operation panel 5111 is not limited to the illustrated example, and the user may be capable of operation input to each device that may be controlled by the audiovisual controller 5107 and the operation room control device 5109 included in the operation room system 5100 via the centralized operation panel 5111.

Figure 16:
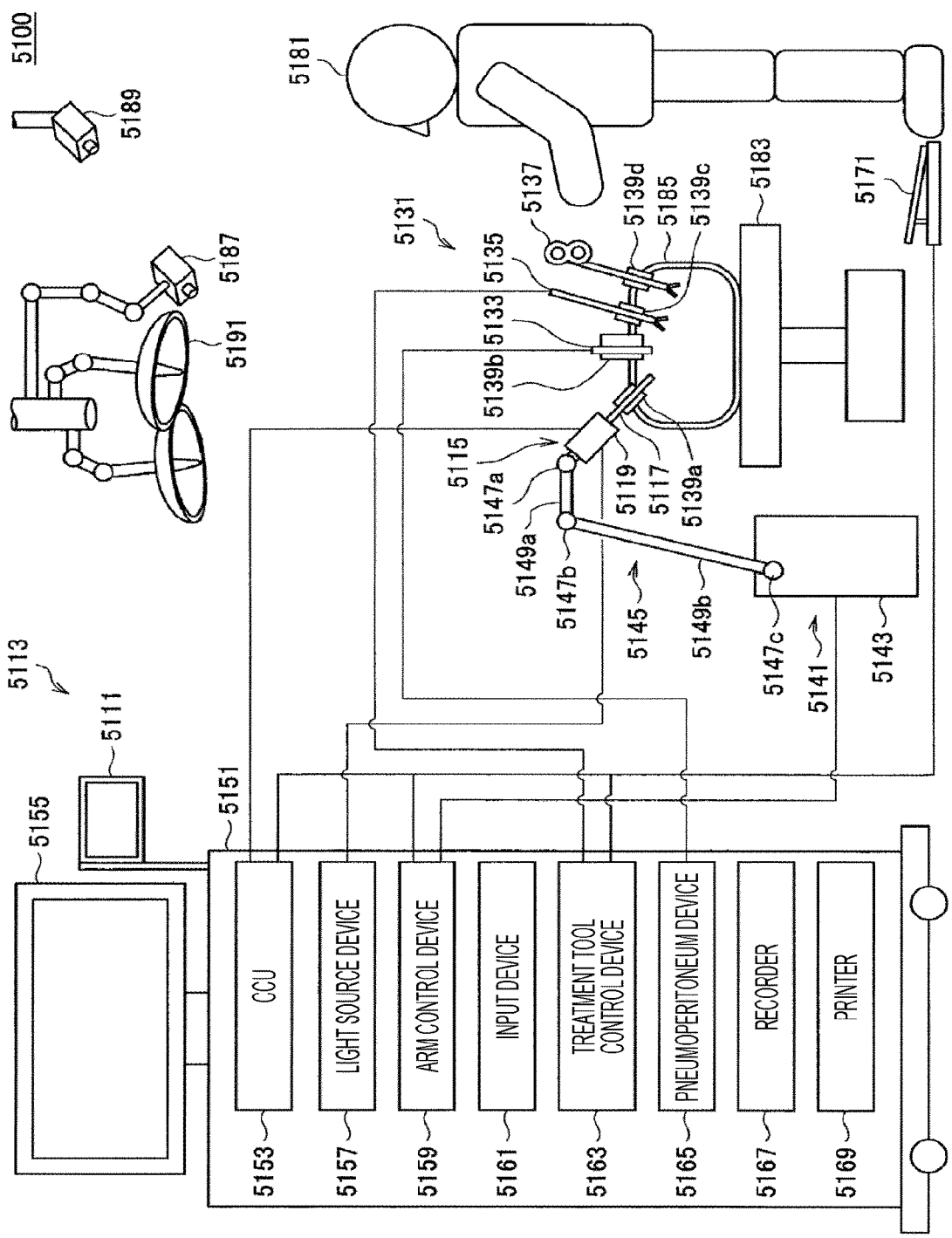
FIG. 16 is a diagram illustrating an example of a state of surgery to which the operation room system is applied.

FIG. 16 is a diagram illustrating an example of a state of surgery to which the operation room system described above is applied. The ceiling camera 5187 and the operation room camera 5189 are provided on the ceiling of the operation room, and can image the state of the area at hand of a surgeon (surgeon) 5181 who performs treatment on an affected part of a patient 5185 on the patient bed 5183, and the entire operation room. The ceiling camera 5187 and the operation room camera 5189 can be provided with a magnification adjustment function, a focal length adjustment function, an imaging direction adjustment function, and the like. The illumination 5191 is provided on the ceiling of the operation room, and irradiates at least the area at hand of the surgeon 5181. The illumination 5191 may be enabled to appropriately adjust the amount of irradiation light, the wavelength (color) of the irradiation light, the irradiation direction of the light, and the like.

As illustrated in FIG. 14, the endoscopic surgical system 5113, the patient bed 5183, the ceiling camera 5187, the operation room camera 5189, and the illumination 5191 are connected to each other to be able to cooperate with each other via the audiovisual controller 5107 and the operation room control device 5109 (not illustrated in FIG. 16). The centralized operation panel 5111 is provided in the operation room, and as described above, the user can appropriately operate these devices existing in the operation room via the centralized operation panel 5111.

Hereinafter, a configuration of the endoscopic surgical system 5113 will be described in detail. As illustrated, the endoscopic surgical system 5113 includes an endoscope 5115, other surgical tools 5131, a support arm device 5141 that supports the endoscope 5115, and a cart 5151 on which various devices for endoscopic surgery are mounted.

In endoscopic surgery, instead of performing laparotomy by incising an abdominal wall, a plurality of cylindrical opening devices called trocars 5139a to 5139d punctures the abdominal wall. Then, a lens barrel 5117 of the endoscope 5115 and the other surgical tools 5131 are inserted into a body cavity of the patient 5185 from the trocars 5139a to 5139d. In the illustrated example, a pneumoperitoneum tube 5133, an energy treatment tool 5135, and forceps 5137 are inserted into the body cavity of the patient 5185 as the other surgical tools 5131. Furthermore, the energy treatment tool 5135 is a treatment tool that performs incision and peeling of tissue, sealing of a blood vessel, or the like by a high-frequency current or ultrasonic vibration. However, the surgical tools 5131 illustrated are merely examples, and various surgical tools generally used in endoscopic surgery may be used as the surgical tools 5131, for example, tweezers, a retractor, and the like.

An image of a surgical portion in the body cavity of the patient 5185 imaged by the endoscope 5115 is displayed on a display device 5155. The surgeon 5181 performs a treatment, for example, excising the affected part, or the like, by using the energy treatment tool 5135 and the forceps 5137 while viewing the image of the surgical portion displayed on the display device 5155 in real time. Note that, although not illustrated, the pneumoperitoneum tube 5133, the energy treatment tool 5135, and the forceps 5137 are supported by the surgeon 5181, an assistant, or the like during the surgery.

(Support Arm Device)

The support arm device 5141 includes an arm 5145 extending from a base 5143. In the illustrated example, the arm 5145 includes joints 5147a, 5147b, and 5147c and links 5149a and 5149b, and is driven by control of an arm control device 5159. The endoscope 5115 is supported by the arm 5145, and its position and posture are controlled. As a result, stable position fixing can be implemented of the endoscope 5115.

(Endoscope)

The endoscope 5115 includes the lens barrel 5117 in which a region of a predetermined length from the distal end is inserted into the body cavity of the patient 5185, and a camera head 5119 connected to the proximal end of the lens barrel 5117. In the illustrated example, the endoscope 5115 formed as a so-called rigid scope including the rigid lens barrel 5117 is illustrated, but the endoscope 5115 may be formed as a so-called flexible scope including the flexible lens barrel 5117.

At the distal end of the lens barrel 5117, an opening is provided into which an objective lens is fitted. A light source device 5157 is connected to the endoscope 5115, and light generated by the light source device 5157 is guided to the distal end of the lens barrel by a light guide extending inside the lens barrel 5117, and the light is emitted toward an observation target in the body cavity of the patient 5185 via the objective lens. Note that, the endoscope 5115 may be a forward-viewing endoscope, an oblique-viewing endoscope, or a side-viewing endoscope.

An optical system and an imaging element are provided inside the camera head 5119, and reflected light (observation light) from the observation target is focused on the imaging element by the optical system. The observation light is photoelectrically converted by the imaging element, and an electric signal corresponding to the observation light, that is, an image signal corresponding to the observation image is generated. The image signal is transmitted as RAW data to a camera control unit (CCU) 5153. Note that, in the camera head 5119, a function is installed of adjusting the magnification and the focal length by appropriately driving the optical system.

Note that, for example, to cope with stereoscopic vision (3D display) or the like, the camera head 5119 may be provided with a plurality of the imaging elements. In this case, a plurality of relay optical systems is provided inside the lens barrel 5117 to guide the observation light to each of the plurality of imaging elements.

(Various Devices Mounted on Cart)

The CCU 5153 includes a central processing unit (CPU), a graphics processing unit (GPU), and the like, and comprehensively controls operation of the endoscope 5115 and the display device 5155. Specifically, the CCU 5153 performs, on the image signal received from the camera head 5119, various types of image processing for displaying an image based on the image signal, for example, development processing (demosaic processing), and the like. The CCU 5153 provides the display device 5155 with the image signal on which the image processing is performed. Furthermore, the audiovisual controller 5107 illustrated in FIG. 14 is connected to the CCU 5153. The CCU 5153 also provides the audiovisual controller 5107 with the image signal on which the image processing is performed. Furthermore, the CCU 5153 transmits a control signal to the camera head 5119 to control its drive. The control signal can include information regarding imaging conditions such as the magnification and the focal length. The information regarding the imaging conditions may be input via an input device 5161, or may be input via the centralized operation panel 5111 described above.

The display device 5155 displays an image based on the image signal subjected to the image processing by the CCU 5153, by the control from the CCU 5153. In a case where the endoscope 5115 is compatible with high-resolution imaging, for example, 4K (the number of horizontal pixels 3840×the number of vertical pixels 2160), 8K (the number of horizontal pixels 7680×the number of vertical pixels 4320), and the like, and/or in a case where the endoscope 5115 is compatible with 3D display, as the display device 5155, corresponding to each case, a display device can be used capable of high-resolution display and/or 3D display. In a case where the display device 5155 is compatible with the high-resolution imaging such as 4K or 8K, a more immersive feeling can be obtained by using a display device having a size of greater than or equal to 55 inches. Furthermore, a plurality of the display devices 5155 having different resolutions and sizes may be provided depending on applications.

The light source device 5157 includes a light source, for example, a light emitting diode (LED) or the like, and supplies irradiation light for imaging a surgical portion to the endoscope 5115.

The arm control device 5159 includes a processor, for example, a CPU or the like, and controls drive of the arm 5145 of the support arm device 5141 in accordance with a predetermined control method by operating in accordance with a predetermined program.

The input device 5161 is an input interface to the endoscopic surgical system 5113. The user can input various types of information and instructions to the endoscopic surgical system 5113 via the input device 5161. For example, the user inputs various types of information regarding the surgery, such as the patient's physical information and information about the surgical method, via the input device 5161. Furthermore, for example, the user inputs, via the input device 5161, an instruction to drive the arm 5145, an instruction to change the imaging conditions (type of irradiation light, magnification, focal length, and the like) by the endoscope 5115, an instruction to drive the energy treatment tool 5135, and the like.

The type of the input device 5161 is not limited, and the input device 5161 may be any of various known input devices. As the input device 5161, for example, a mouse, a keyboard, a touch panel, a switch, a foot switch 5171 and/or a lever and the like can be applied. In a case where a touch panel is used as the input device 5161, the touch panel may be provided on the display surface of the display device 5155.

Alternatively, the input device 5161 is a device worn by the user, for example, a glasses-type wearable device, a head mounted display (HMD), or the like, and various inputs are performed depending on the user's gesture and line-of-sight detected by these devices. Furthermore, the input device 5161 includes a camera enabled to detect the user's movement, and various inputs are performed depending on the user's gesture and line-of-sight detected from a video captured by the camera. Moreover, the input device 5161 includes a microphone enabled to pick up a user's voice, and various inputs are performed by voice via the microphone. As described above, the input device 5161 is enabled to input various information without contact, whereby in particular the user (for example, the surgeon 5181) belonging to a clean area can operate a device belonging to an unclean area without contact. Furthermore, since the user can operate the device without releasing the user's hand from the surgical tool, convenience of the user is improved.

A treatment tool control device 5163 controls drive of the energy treatment tool 5135 for cauterization of tissue, incision, sealing of blood vessels, or the like. A pneumoperitoneum device 5165 injects a gas into the body cavity of the patient 5185 via the pneumoperitoneum tube 5133 to inflate the body cavity, for the purpose of securing a visual field by the endoscope 5115 and securing a working space of the surgeon. A recorder 5167 is a device enabled to record various types of information regarding surgery. A printer 5169 is a device enabled to print various types of information regarding surgery in various formats such as text, image, graph, and the like.

Hereinafter, a particularly characteristic configuration in the endoscopic surgical system 5113 will be described in detail.

(Support Arm Device)

The support arm device 5141 includes the base 5143 that is a base, and the arm 5145 extending from the base 5143. In the illustrated example, the arm 5145 includes the plurality of joints 5147a, 5147b, and 5147c, and the plurality of links 5149a and 5149b coupled together by the joint 5147b, but in FIG. 16, for simplicity, the configuration of the arm 5145 is simplified and illustrated. Actually, the shape, number, and arrangement of the joints 5147a to 5147c and the links 5149a and 5149b, the direction of the rotation axis of the joints 5147a to 5147c, and the like can be appropriately set so that the arm 5145 has a desired degree of freedom. For example, the arm 5145 can suitably have six degrees of freedom or more. As a result, the endoscope 5115 can be freely moved within the movable range of the arm 5145, so that the lens barrel 5117 of the endoscope 5115 can be inserted into the body cavity of the patient 5185 from a desired direction.

The joints 5147a to 5147c each are provided with an actuator, and the joints 5147a to 5147c each are rotatable around a predetermined rotation axis by drive of the actuator. The drive of the actuator is controlled by the arm control device 5159, whereby the rotation angle of each of the joints 5147a to 5147c is controlled, and the drive of the arm 5145 is controlled. As a result, control of the position and posture of the endoscope 5115 can be implemented. At this time, the arm control device 5159 can control the drive of the arm 5145 by various known control methods such as force control or position control.

For example, the surgeon 5181 performs operation input appropriately via the input device 5161 (including the foot switch 5171), whereby the drive of the arm 5145 may be appropriately controlled by the arm control device 5159 depending on the operation input, and the position and posture of the endoscope 5115 may be controlled. By the control, the endoscope 5115 at the distal end of the arm 5145 can be moved from an arbitrary position to an arbitrary position, and then fixedly supported at the position after the movement. Note that, the arm 5145 may be operated by a so-called master slave method. In this case, the arm 5145 can be remotely operated by the user via the input device 5161 installed at a location away from the operation room.

Furthermore, in a case where force control is applied, the arm control device 5159 may perform so-called power assist control in which external force is received from the user, and the actuator of each of the joints 5147a to 5147c is driven so that the arm 5145 moves smoothly following the external force. As a result, when the user moves the arm 5145 while directly touching the arm 5145, the arm 5145 can be moved with a relatively light force. Thus, the endoscope 5115 can be moved more intuitively and with a simpler operation, and the convenience for the user can be improved.

Here, in general, in the endoscopic surgery, the endoscope 5115 is supported by a surgeon called a scopist. In contrast, by using the support arm device 5141, the position of the endoscope 5115 can be more reliably fixed without relying on human hands, so that an image of the surgical portion can be stably obtained, and the surgery can be smoothly performed.

Note that, the arm control device 5159 is not necessarily provided in the cart 5151. Furthermore, the arm control device 5159 does not necessarily have to be one device. For example, the arm control device 5159 may be provided at each of the joints 5147a to 5147c of the arm 5145 of the support arm device 5141, and a plurality of the arm control devices 5159 cooperates with each other, whereby drive control of the arm 5145 may be implemented.

(Light Source Device)

The light source device 5157 supplies the endoscope 5115 with irradiation light when a surgical portion is imaged. The light source device 5157 includes a white light source including, for example, an LED, a laser light source, or a combination thereof. At this time, in a case where the white light source includes a combination of R, G, and B laser light sources, the output intensity and the output timing of each color (each wavelength) can be controlled with high accuracy, so that adjustment can be performed of the white balance of the captured image in the light source device 5157. Furthermore, in this case, it is also possible to capture an image corresponding to each of R, G, and B in time division by emitting the laser light from each of the R, G, and B laser light sources in time division to the observation target, and controlling drive of the imaging element of the camera head 5119 in synchronization with the emission timing. According to this method, a color image can be obtained without providing a color filter in the imaging element.

Furthermore, drive of the light source device 5157 may be controlled such that the intensity of light to be output is changed at predetermined time intervals. By controlling the drive of the imaging element of the camera head 5119 in synchronization with the change timing of the light intensity to acquire images in time division, and synthesizing the images, a high dynamic range image can be generated without so-called blocked up shadows or blown out highlights.

Furthermore, the light source device 5157 may be able to supply light of a predetermined wavelength band corresponding to special light observation. In the special light observation, for example, by using wavelength dependence of light absorption in a body tissue, by emitting narrow band light compared to irradiation light (in other words, white light) at the time of ordinary observation, so-called narrow band imaging is performed in which a predetermined tissue such as a blood vessel in a mucosal surface layer is imaged with high contrast. Alternatively, in the special light observation, fluorescence observation may be performed that obtains an image by fluorescence generated by emitting excitation light. In the fluorescence observation, it is possible to irradiate a body tissue with excitation light to observe the fluorescence from the body tissue (autofluorescence observation), or to locally inject a reagent such as indocyanine green (ICG) into a body tissue and irradiate the body tissue with excitation light corresponding to the fluorescence wavelength of the reagent to obtain a fluorescent image, for example. The light source device 5157 may be able to supply narrow band light and/or excitation light corresponding to such special light observation.

(Camera Head and CCU)

Figure 17:
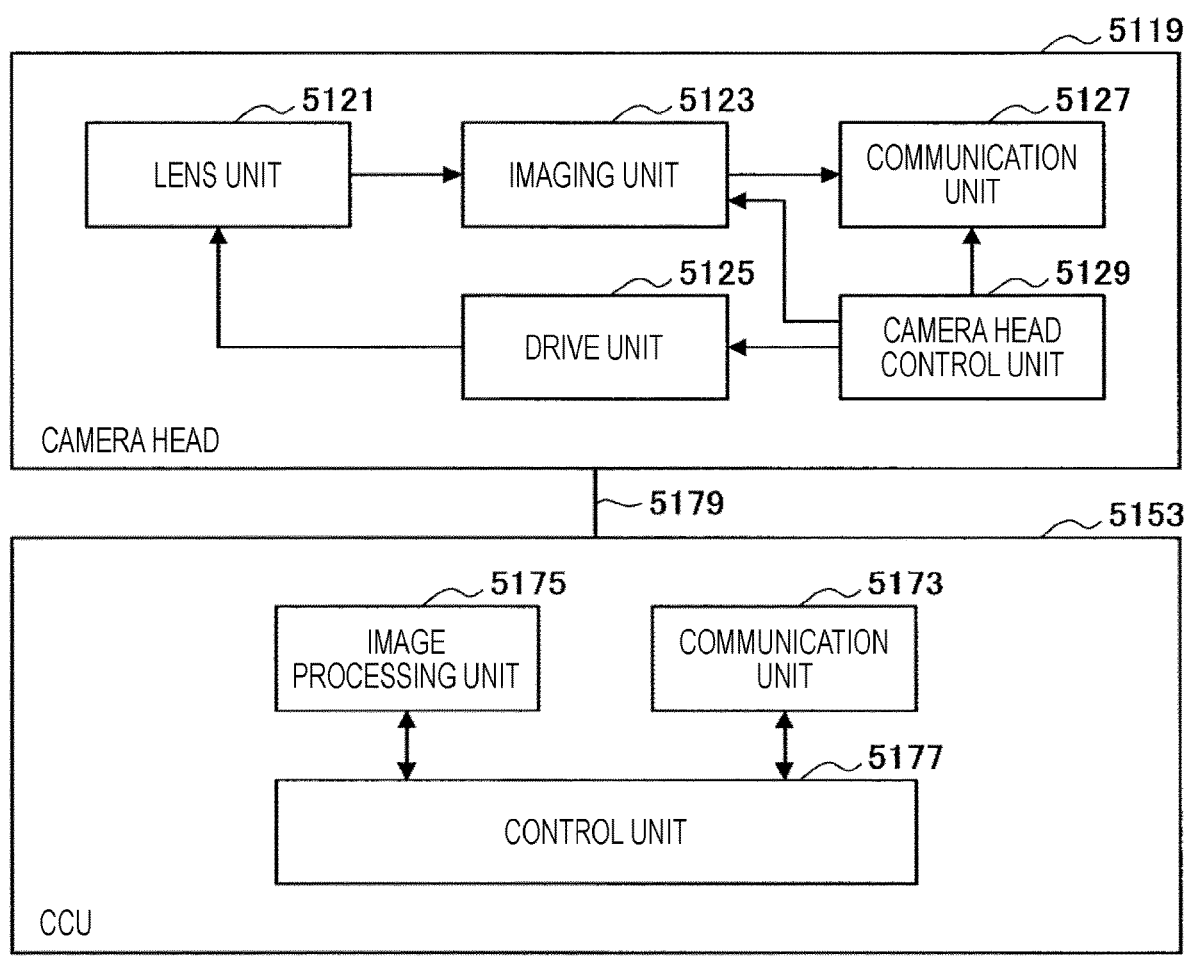
FIG. 17 is a block diagram illustrating an example of a functional configuration of a camera head and a CCU illustrated in FIG. 16.

The functions of the camera head 5119 and the CCU 5153 of the endoscope 5115 will be described in more detail with reference to FIG. 17. FIG. 17 is a block diagram illustrating an example of a functional configuration of the camera head 5119 and the CCU 5153 illustrated in FIG. 16.

Referring to FIG. 17, the camera head 5119 includes, as its functions, a lens unit 5121, an imaging unit 5123, a drive unit 5125, a communication unit 5127, and a camera head control unit 5129. Furthermore, the CCU 5153 includes, as its functions, a communication unit 5173, an image processing unit 5175, and a control unit 5177. The camera head 5119 and the CCU 5153 are communicably connected to each other in both directions by a transmission cable 5179.

First, the functional configuration of the camera head 5119 will be described. The lens unit 5121 is an optical system provided at a connection portion with the lens barrel 5117. The observation light captured from the distal end of the lens barrel 5117 is guided to the camera head 5119 and is incident on the lens unit 5121. The lens unit 5121 includes a combination of a plurality of lenses including a zoom lens and a focus lens. Optical characteristics of the lens unit 5121 are adjusted so that the observation light is focused on the light-receiving surface of the imaging element of the imaging unit 5123. Furthermore, positions on the optical axis of the zoom lens and the focus lens are movable to adjust the magnification and focus of a captured image.

The imaging unit 5123 includes an imaging element, and is arranged at the subsequent stage of the lens unit 5121. The observation light passing through the lens unit 5121 is focused on the light-receiving surface of the imaging element, and an image signal corresponding to the observation image is generated by photoelectric conversion. The image signal generated by the imaging unit 5123 is provided to the communication unit 5127.

As the imaging element constituting the imaging unit 5123, for example, an element is used that is a complementary metal oxide semiconductor (CMOS) type image sensor, and is capable of color imaging having a Bayer array. Note that, as the imaging element, an element may be used compatible with imaging of the high-resolution image of greater than or equal to 4K, for example. The image of the surgical portion is obtained with high resolution, whereby the surgeon 5181 can grasp a state of the surgical portion in more detail, and can perform the surgery more smoothly.

Furthermore, the imaging element constituting the imaging unit 5123 includes a pair of imaging elements for acquiring image signals for the right-eye and left-eye to cope with 3D display. By performing the 3D display, the surgeon 5181 can grasp the depth of living tissue in a surgical portion more accurately. Note that, in a case where the imaging unit 5123 includes a multi-chip imaging element, a plurality of systems of the lens units 5121 is provided corresponding to respective imaging elements.

Furthermore, the imaging unit 5123 is not necessarily provided in the camera head 5119. For example, the imaging unit 5123 may be provided inside the lens barrel 5117 immediately after the objective lens.

The drive unit 5125 includes an actuator and moves the zoom lens and the focus lens of the lens unit 5121 by a predetermined distance along the optical axis by control of the camera head control unit 5129. As a result, the magnification and the focus of the captured image by the imaging unit 5123 can be appropriately adjusted.

The communication unit 5127 includes a communication device for transmitting/receiving various types of information to/from the CCU 5153. The communication unit 5127 transmits the image signal obtained from the imaging unit 5123 as RAW data to the CCU 5153 via the transmission cable 5179. At this time, to display the captured image of the surgical portion with low latency, the image signal is preferably transmitted by optical communication. This is because it is required that a video image of the surgical portion is displayed in real time as much as possible for safer and more reliable surgery since the surgeon 5181 performs the surgery while observing a state of the affected part with the captured image during the surgery. In a case where optical communication is performed, the communication unit 5127 is provided with a photoelectric conversion module that converts an electric signal into an optical signal. The image signal is converted into an optical signal by the photoelectric conversion module, and then transmitted to the CCU 5153 via the transmission cable 5179.

Furthermore, the communication unit 5127 receives the control signal for controlling the drive of the camera head 5119 from the CCU 5153. The control signal includes information regarding imaging conditions, for example, information that specifies the frame rate of the captured image, information that specifies the exposure value at the time of imaging, and/or information that specifies the magnification and focus of the captured image. The communication unit 5127 provides the received control signal to the camera head control unit 5129. Note that, the control signal from the CCU 5153 may also be transmitted by optical communication. In this case, the communication unit 5127 is provided with a photoelectric conversion module that converts an optical signal into an electric signal, and the control signal is converted into an electric signal by the photoelectric conversion module and then provided to the camera head control unit 5129.

Note that, the above-described imaging conditions such as the frame rate, the exposure value, the magnification, and the focus are automatically set by the control unit 5177 of the CCU 5153 on the basis of the image signal acquired. That is, a so-called auto exposure (AE) function, auto-focus (AF) function, and auto white balance (AWB) function are installed in the endoscope 5115.

The camera head control unit 5129 controls the drive of the camera head 5119 on the basis of the control signal from the CCU 5153 received via the communication unit 5127. For example, the camera head control unit 5129 controls drive of the imaging element of the imaging unit 5123 on the basis of the information that specifies the frame rate of the captured image and/or the information that specifies the exposure at the time of imaging. Furthermore, for example, the camera head control unit 5129 appropriately moves the zoom lens and focus lens of the lens unit 5121 via the drive unit 5125 on the basis of the information that specifies the magnification and focus of the captured image. The camera head control unit 5129 may further have a function of storing information for identifying the lens barrel 5117 and the camera head 5119.

Note that, the camera head 5119 can be made to have resistance to autoclave sterilization by arranging the lens unit 5121, the imaging unit 5123, and the like in a sealed structure with high airtightness and waterproofness.

Next, the functional configuration of the CCU 5153 will be described. The communication unit 5173 includes a communication device for transmitting/receiving various types of information to/from the camera head 5119. The communication unit 5173 receives the image signal transmitted from the camera head 5119 via the transmission cable 5179. At this time, as described above, the image signal can be suitably transmitted by optical communication. In this case, to be adaptable to optical communication, the communication unit 5173 is provided with a photoelectric conversion module that converts an optical signal into an electric signal. The communication unit 5173 provides the image signal converted into the electric signal to the image processing unit 5175.

Furthermore, the communication unit 5173 transmits the control signal for controlling the drive of the camera head 5119 to the camera head 5119. The control signal may also be transmitted by optical communication.

The image processing unit 5175 performs various types of image processing on the image signal that is RAW data transmitted from the camera head 5119. Examples of the image processing includes various types of known signal processing, for example, development processing, image quality enhancement processing (such as band enhancement processing, super-resolution processing, noise reduction (NR) processing and/or camera shake correction processing), and/or enlargement processing (electronic zoom processing), and the like. Furthermore, the image processing unit 5175 performs detection processing on the image signal for performing AE, AF, and AWB.

The image processing unit 5175 includes a processor such as a CPU or GPU, and the image processing and detection processing described above can be performed by the processor operating in accordance with a predetermined program. Note that, in a case where the image processing unit 5175 includes a plurality of GPUs, the image processing unit 5175 appropriately divides information related to the image signal and performs the image processing in parallel by the plurality of GPUs.

The control unit 5177 performs various types of control regarding imaging of the surgical portion by the endoscope 5115 and display of the captured image. For example, the control unit 5177 generates the control signal for controlling the drive of the camera head 5119. At this time, in a case where the imaging condition is input by the user, the control unit 5177 generates the control signal on the basis of the input by the user. Alternatively, in a case where the AE function, the AF function, and the AWB function are installed in the endoscope 5115, the control unit 5177 generates the control signal by appropriately calculating the optimum exposure value, focal length, and white balance depending on a result of the detection processing by the image processing unit 5175.

Furthermore, the control unit 5177 causes the display device 5155 to display the image of the surgical portion on the basis of the image signal subjected to the image processing by the image processing unit 5175. At this time, the control unit 5177 recognizes various objects in the surgical portion image by using various image recognition technologies. For example, the control unit 5177 detects color, a shape of an edge, and the like of the object included in the surgical portion image, thereby being able to recognize the surgical tools such as the forceps, a specific body part, bleeding, mist at the time of using the energy treatment tool 5135, or the like. When causing the display device 5155 to display the image of the surgical portion, the control unit 5177 causes the display device 5155 to superimpose and display various types of surgery assistance information on the image of the surgical portion by using the recognition result. The surgery assistance information is superimposed and displayed, and presented to the surgeon 5181, whereby the surgery can be performed more safely and reliably.

The transmission cable 5179 connecting the camera head 5119 and the CCU 5153 together is an electric signal cable adaptable to communication of electric signals, an optical fiber adaptable to optical communication, or a composite cable thereof.

Here, in the illustrated example, communication is performed by wire using the transmission cable 5179, but communication between the camera head 5119 and the CCU 5153 may be performed wirelessly. In a case where the communication between the two is performed wirelessly, it is not necessary to install the transmission cable 5179 in the operation room, so that a situation can be eliminated where the movement of the medical staff in the operation room is hindered by the transmission cable 5179.

In the above, the example has been described of the operation room system 5100 to which the technology according to the present disclosure can be applied. Note that, here, as an example, the case has been described where the medical system to which the operation room system 5100 is applied is the endoscopic surgical system 5113, but the configuration of the operation room system 5100 is not limited to such an example. For example, the operation room system 5100 may be applied to an inspection flexible endoscope system or a microscopic surgical system instead of the endoscopic surgical system 5113.

The technology according to the present disclosure can be suitably applied to the network configuring the operation room system 5100 among the configurations described above. By applying the technology according to the present disclosure to the operation room system 5100, it is possible to build a network system that efficiently connects devices each other at low cost.

In the above, the preferred embodiments of the present disclosure have been described in detail with reference to the accompanying drawings; however, the technical scope of the present disclosure is not limited to such examples. It is obvious that persons having ordinary knowledge in the technical field of the present disclosure can conceive various modification examples or correction examples within the scope of the technical idea described in the claims, and it is understood that the modification examples or correction examples also belong to the technical scope of the present disclosure.

Furthermore, the effects described in the present specification are merely illustrative or exemplary and not restrictive. That is, the technology according to the present disclosure can exhibit other effects obvious to those skilled in the art from the description of the present specification together with the above-described effects or in place of the above-described effects.

Note that, the following configurations also belong to the technical scope of the present disclosure.

(1) A system controller controlling an IP switch that distributes data received from a device on a transmission side to a device on a reception side,
the system controller building a plurality of virtual networks in the IP switch and causing data received by any of the virtual networks to be transmitted to respective distribution destinations connected to the virtual networks.

(2) The system controller according to (1), in which the IP switch includes a plurality of switches hierarchized, and the virtual networks are built in the plurality of switches.

(3) The system controller according to (2), in which any two switches of the plurality of switches are connected to each other by a plurality of links.

(4) The system controller according to (2) or (3), in which each of the distribution destinations to which the data received by any of the virtual networks is transmitted is a device on the reception side connected to one of the switches in which the any of the virtual networks is built, or another of the switches connected to the one of the switches in which the any of the virtual networks is built.

(5) The system controller according to (3) or (4), further including a load distribution unit that performs load distribution on the basis of the size of a data stream, the bandwidth of the links, or the bandwidth of a port of the switch, in a case where the data received is a multicast.

(6) The system controller according to (5), in which the load distribution unit performs the load distribution for each data stream.

(7) The system controller according to any of (2) to (6), further including a display control unit that controls display of a network topology on the basis of information on a data flow in each of the switches and information on a data flow of a device connected to the IP switch.

(8) The system controller according to any of (1) to (7), in which the data is audio data or video data.

(9) A network system including:
an IP switch that distributes data received from a device on a transmission side to a device on a reception side; and
a system controller that controls the IP switch, in which the system controller builds a plurality of virtual networks in the IP switch and causes data received by any of the virtual networks to be transmitted to respective distribution destinations connected to the virtual networks.

(10) The network system according to (9), in which the IP switch includes a plurality of switches hierarchized, and the virtual networks are built in the plurality of switches.

(11) The network system according to (10), in which any two switches of the plurality of switches are connected to each other by a plurality of links.

(12) The network system according to (10) or (11), in which each of the distribution destinations to which the data received by any of the virtual networks is transmitted is a device on the reception side connected to one of the switches in which the any of the virtual networks is built, or another of the switches connected to the one of the switches in which the any of the virtual networks is built.

(13) The network system according to (11) or (12), further including a load distribution unit that performs load distribution on the basis of the size of a data stream, the bandwidth of the links, or the bandwidth of a port of the switch, in a case where the data received is a multicast.

(14) The network system according to (13), in which the load distribution unit performs the load distribution for each data stream.

(15) The network system according to any of (11) to (14), further including a display control unit that controls display of a network topology on the basis of information on a data flow in each of the switches and information on a data flow of a device connected to the IP switch.

(16) The network system according to any of (9) to (15), in which the data is audio data or video data.

(17) A method in a network system for controlling an IP switch that distributes data received from a device on a transmission side to a device on a reception side, the method including
building a plurality of virtual networks in the IP switch and causing data received by any of the virtual networks to be transmitted to respective distribution destinations connected to the virtual networks.

REFERENCE SIGNS LIST

100 AV device
200 IP switch
222, 224 Virtual network
500 SDN controller
502 Load distribution unit
504 Broadcast unit
506 Flow display control unit

The invention claimed is:

1. A system controller controlling an IP switch that distributes data received from a device on a transmission side to a device on a reception side, the system controller comprising:
circuitry configured to build a plurality of virtual networks in the IP switch and cause data received by any of the virtual networks to be transmitted to respective distribution destinations connected to the virtual networks,
wherein the IP switch includes a plurality of software defined network (SDN) switches arranged in a hierarchy,
the plurality of virtual networks are built in the plurality of SDN switches, and
at least one SDN switch of the plurality of SDN switches forms part of two virtual networks of the plurality of virtual networks.

2. The system controller according to claim 1, wherein any two SDN switches of the plurality of SDN switches are connected to each other by a plurality of links.

3. The system controller according to claim 1, wherein each of the distribution destinations to which the data received by any of the virtual networks is transmitted is a device on the reception side connected to one of the SDN switches in which the any of the virtual networks is built, or another of the SDN switches connected to the one of the SDN switches in which the any of the virtual networks is built.

4. The system controller according to claim 2, further comprising load distribution circuitry configured to perform load distribution of data flowing between the plurality of SDN switches based on a table specified from an application side.

5. The system controller according to claim 2, wherein the load distribution circuitry is further configured to perform the load distribution for each of a plurality of data streams.

6. The system controller according to claim 1, further comprising display control circuitry configured to control display of a network topology based on information on a data flow in each of the SDN switches and information on a data flow of a device connected to the IP switch.

7. The system controller according to claim 1, wherein the data received by the virtual networks is audio data or video data.

8. A network system, comprising:
   an IP switch configured to distribute data received from a device on a transmission side to a device on a reception side, and
   a system controller configured to control the IP switch,
   wherein the system controller is further configured to build a plurality of virtual networks in the IP switch and cause data received by any of the virtual networks to be transmitted to respective distribution destinations connected to the virtual networks,
   the IP switch includes a plurality of software defined network (SDN) switches arranged in a hierarchy,
   the plurality of virtual networks are built in the plurality of SDN switches, and
   at least one SDN switch of the plurality of SDN switches forms part of two virtual networks of the plurality of virtual networks.

9. The network system according to claim 8, wherein any two SDN switches of the plurality of SDN switches are connected to each other by a plurality of links.

10. The network system according to claim 8, wherein each of the distribution destinations to which the data received by any of the virtual networks is transmitted is a device on the reception side connected to one of the SDN switches in which the any of the virtual networks is built, or another of the SDN switches connected to the one of the SDN switches in which the any of the virtual networks is built.

11. The network system according to claim 9, wherein the system controller includes load distribution circuitry configured to perform load distribution of data flowing between the plurality of SDN switches based on a table specified from an application side.

12. The network system according to claim 11, wherein the load distribution circuitry is further configured to perform the load distribution for each of a plurality of data streams.

13. The network system according to claim 8, wherein the system controller includes display control circuitry configured to control display of a network topology based on information on a data flow in each of the SDN switches and information on a data flow of a device connected to the IP switch.

14. The network system according to claim 8, wherein the data distributed by the IP switch is audio data or video data.

15. A method in a network system for controlling an IP switch that distributes data received from a device on a transmission side to a device on a reception side, the method comprising:
   building a plurality of virtual networks in the IP switch, and causing data received by any of the virtual networks to be transmitted to respective distribution destinations connected to the virtual networks,
   wherein the IP switch dudes a plurality of software defined network (SDN) switches arranged in a hierarchy,
   the plurality of virtual networks are built in the plurality of SDN switches, and
   at least one SDN switch of the plurality of SDN switches forms part of two virtual networks of the plurality of virtual networks.

\* \* \* \* \*